(12) United States Patent
Hirata et al.

(10) Patent No.: US 8,020,999 B2
(45) Date of Patent: Sep. 20, 2011

(54) PROJECTION TYPE IMAGE DISPLAY APPARATUS

(75) Inventors: Koji Hirata, Yokohama (JP); Takanori Hisada, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/825,801

(22) Filed: Jun. 29, 2010

(65) Prior Publication Data

US 2010/0265470 A1 Oct. 21, 2010

Related U.S. Application Data

(63) Continuation of application No. 11/763,465, filed on Jun. 15, 2007, now Pat. No. 7,766,488.

(30) Foreign Application Priority Data

Jun. 15, 2006 (JP) ................. 2006-166434

(51) Int. Cl.
G03B 21/14 (2006.01)
G03B 21/28 (2006.01)

(52) U.S. Cl. .............. 353/70; 353/69; 353/77; 353/101; 359/649; 359/813; 359/823

(58) Field of Classification Search .................. 353/69, 353/70, 77, 98, 101; 359/448, 649, 726, 359/813, 823, 846, 850
See application file for complete search history.

(56) References Cited

U.S. PATENT DOCUMENTS

| 5,648,871 | A | 7/1997 | Okuyama et al. |
| 5,986,806 | A | 11/1999 | Sugawara |
| 6,220,712 | B1 | 4/2001 | Ohzawa |
| 2003/0107716 | A1 | 6/2003 | Ogawa |
| 2004/0141157 | A1 | 7/2004 | Ramachandran |
| 2004/0196568 | A1 | 10/2004 | Matsuo |
| 2006/0092385 | A1 | 5/2006 | Hisada |
| 2006/0114430 | A1 | 6/2006 | Masubuchi et al. |
| 2006/0164605 | A1 | 7/2006 | Kuwa |
| 2006/0227299 | A1 | 10/2006 | Hisada |
| 2006/0227432 | A1 | 10/2006 | Yoshikawa et al. |
| 2009/0115975 | A1 | 5/2009 | Ogura |
| 2010/0290010 | A1* | 11/2010 | Hirata et al. ............ 353/37 |

FOREIGN PATENT DOCUMENTS

| JP | 05-134213 | 5/1993 |
| JP | 2000-162544 | 6/2000 |
| JP | 2004-157560 | 6/2004 |
| JP | 2006-138882 | 6/2006 |
| JP | 2006-154041 | 6/2006 |
| JP | 2006-292900 | 10/2006 |
| JP | 2006-292901 | 10/2006 |

* cited by examiner

*Primary Examiner* — Kevin Pyo
(74) *Attorney, Agent, or Firm* — Antonelli, Terry, Stout & Kraus, LLP.

(57) ABSTRACT

A projection type image display apparatus includes an image display element, and a projection optical unit, which is configured to project an image displayed on the image display element, enlargedly, upon a screen. The projection optical unit includes a lens group, which is configured to compensate an distortion on an image surface on the screen, a mirror for compensating a trapezoidal distortion on the screen. The mirror reflects lights emitted from the lens group, so as to project upon the screen obliquely.

4 Claims, 29 Drawing Sheets

FIG.4(a) CROSS-SECTION IN VERTICAL DIRECTION

FIG.4(b) CROSS-SECTION IN HORIZONTAL DIRECTION

Sc67

PROJECTION TYPE IMAGE DISPLAY APPARATUS

CROSS REFERENCE TO RELATED APPLICATION

This application is a continuation of U.S. application Ser. No. 11/763,465, filed Jun. 15, 2007, now U.S. Pat. No. 7,766,488, the contents of which are incorporated herein by reference. This application also relates to U.S. application Ser. No. 12/825,836, and U.S. application Ser. No. 12/825,881, both filed the same date as the filing of this application.

BACKGROUND OF THE INVENTION

The present invention relates to a projection-type image displaying apparatus, for conducting image display by projecting an image on a image display element(s), enlargedly, upon a tracing or surface, such as a translucent screen, and it relates to a projection display apparatus, in particular, being suitable for a front-projection type image display apparatus, and further a projection optic unit for the same.

For a color image display apparatus for projecting an image on an image display element(s) onto a screen (a tracing picture) through a projection optic unit, being made up with a plural number of lenses, it is requested to obtain an enlarged image having sufficient size or magnitude on a screen, without generating distortion therein. For achieving this, as is disclosed in Japanese Patent Laying-Open No. Hei 5-134213 (1993) or Japanese Patent Laying-Open No. 2000-162544 (2000), for example, there is already known a projection apparatus or an optic system for projecting an image, enlargedly, into the direction perpendicular to an optical axis of a projection system and also with using an additional optic system, being disposed by inclining by a predetermined angle with respect to that optical axis of the projection system. Herein, the additional optic system (i.e., afocal converter) is an optical system having a function of converting the sizes of projection image, and it is provided for obtaining a rectangular projection image with compensation/reduction upon the distortion of projection image, which is generated accompanying with the projection thereof from the inclined direction onto the screen.

Also, for example, in Japanese Patent Laying-Open No. 2004-157560 (2004), there is already known a reflection-type image forming optical system, for projecting an image on the image display element(s) onto the screen (i.e., the tracing surface), enlargedly, but with using a plural number of reflection mirrors in the place of the lenses mentioned above (i.e., the optic elements within a transmitting system).

BRIEF SUMMARY OF THE INVENTION

When projecting an image onto the screen from direction inclined thereto, then so-called trapezoidal distortion is generated on the projected image. For dissolving this, within structures of the projection optic unit, described in the Japanese Patent Laying-Open No. Hei 5-134213 (1993), the trapezoidal distortion is suppressed with bringing the additional optic system (i.e., the afocal converter) to be eccentric, which is disposed on a screen side. However, for lenses for building up such the eccentric additional optic system, it is difficult to widen the lens angle thereof since the magnification thereof is low, and for that reason, it is necessary to make the distance large from the projection apparatus up to the screen, for obtaining a projection image to have a necessary magnification. And, also the distance is large between the projection screen and the projection system. For this reason, there is a problem that the entire of the apparatus comes to be large (in particular, the length in direction of an optical axis of the optic unit). In addition to the above, it is necessary to provide an additional optic system having a large aperture, as a lens for building up the additional optic eccentric additional optic system mentioned above, but accompanying this, it also results into a reason of rising up the costs of the projection optic unit.

Also, within the projection optic unit described in the Japanese Patent Laying-Open No. 2000-162544 (2000), similar to that shown in the Japanese Patent Laying-Open No. Hei 5-134213 (1993), it is difficult to widen the lens angle due to low magnification thereof, and fit is also difficult to manufacture it, because of the necessity of making the lenses applied eccentric with, separately, and further, in addition thereto, it also necessitates the additional optic system having the large aperture; thereby resulting into a reason of increasing of costs of the projection optic unit.

On the other hand, with the reflection-type image forming optic system described in the Japanese Patent Laying-Open No. 2004-157560 (2004), it aims to obtain a wide angle of view while suppressing large-sizing of the image forming optic system, with applying the reflection-type image forming optic system (i.e., reflection mirrors) in the place of the conventional image forming optic system of transmission type. However, because an amount of eccentricity (or deflection) is large upon the reflection mirror, it is difficult to dispose a plural number of reflection mirrors at correct positions, including inclining angles thereof, and also the inclining angles of the reflection mirrors can be changed, easily, due to vibration, within an apparatus, and therefore it has a problem that it is very difficult to manufacture the apparatus.

Then, according to the present invention, by taking the problems of the conventional arts mentioned above into the consideration thereof, it is an object to provide a projection-type image display apparatus, for enabling the wide angle of view, without enlarging the apparatus, and also relatively easy manufacturability thereof, as well as, a projection optic unit to be applied with such the optic unit therein. Thus, there is provided a technology being suitable for obtaining the projection-type image display apparatus, being more compact by itself, in particular, in external sizes thereof, not only the depth thereof, without necessity of an additional optic system having large aperture, but not generating the trapezoidal distortion.

For accomplishing the object mentioned above, according to the present invention, there is provided a 1. A projection-type image display apparatus for projecting an image, enlargedly, onto a projection surface, comprising: an image display element; a lens group, being disposed behind said image display element, comprising therein, a front lens group made up with a plural number of lenses, including, at least, a refractive lens, having a positive power and being rotationally symmetric in a surface configuration thereof, and a rear lens group made up with a plural number of lenses, including, at least, a lens having a free curved surface configuration and being rotationally asymmetric, thereby emitting the image displayed on said image display element; a reflection mirror for reflecting the light from said lens group, thereby projection onto said projection surface, obliquely; and a movement member for moving the plural number of lenses of said rear lens group.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF PREFERRED EMBODIMENTS

Hereinafter, embodiments according to the present invention will be fully explained by referring to the attached drawings.

Figure 1:
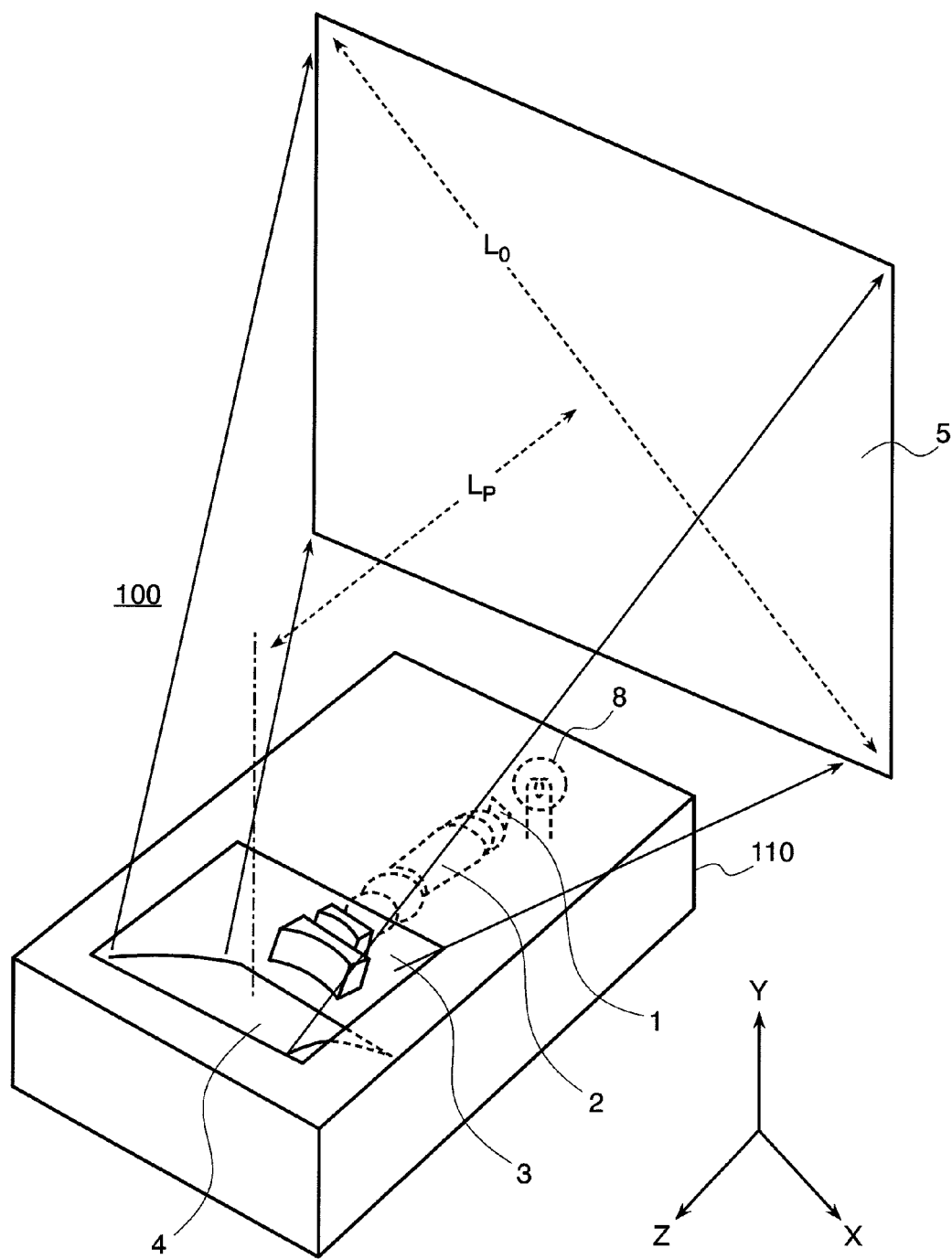
FIG. 1 is a perspective view for showing the entire of a projection-type image display apparatus, according to an embodiment of the present invention.

First of all, FIG. 1 attached herewith is a perspective view for showing the entire structures of a projection-type image display apparatus, according to an embodiment of the present invention. Thus, in this figure, within an inside of an about box-like housing 110 for building up the projection-type image display apparatus are provided an image display element 1 for displaying a picture or an image, which is inputted from an external personal computer, for example, and a light source 8, such as, a lamp, etc., for irradiating white light of high intensity, and wherein, although the structures thereof will be explained in more details later, but there is further mounted a projection optic unit for projecting and irradiating the lights, which are irradiated from the said light source 8 and modulated through the image display element 1, enlargedly. And, in case when using this projection-type image display apparatus within a room, as is shown by an arrow in the figure, the lights emitting from the said projection optic unit are projected onto a wall surface of the room or a sheet-like screen, being positioned opposing thereto, in one direction of that housing 110 (e.g., the longitudinal direction thereof in the figure), i.e., a screen 5.

Figure 2:
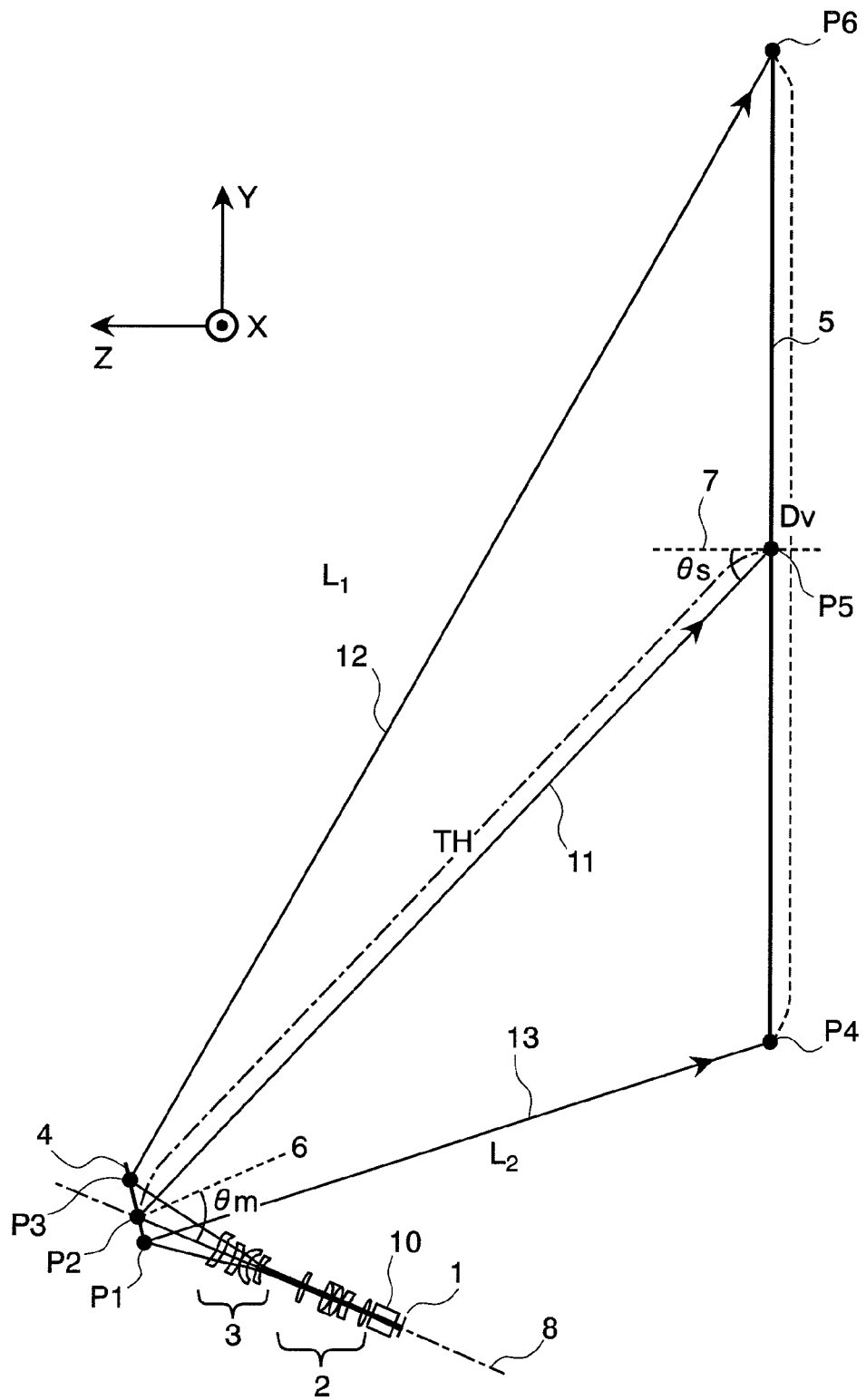
FIG. 2 is a cress-section view of a projection optic unit of the projection-type image display apparatus mentioned above.

Next, by referring to the cross-section view of FIG. 2 attached herewith, explanation will be made on the fundamental or basic optical structures of the projection optic unit building up the projection-type image display apparatus mentioned above. However, this cross-section view of FIG. 2 shows the cross-section, seeing into the lower right direction in FIG. 1 mentioned above (see an outlined arrow in the figure), and this corresponds to Y-Z cross-section within a XYZ coordinates system (shown by arrows in the figure).

As is shown in this FIG. 2, a projection optic unit according to the present invention comprises an image display element 1 and a prism 10, for receiving a light from a light source 8 and emitting a desired image or picture therefrom, a transmission (lens) optic system, being constructed with two (2) lens groups, including a front lens group 2 and a rear lens group 3, and a reflection optic system, including a reflection mirror (herein after, being called a "free curved (or sculptured) surface mirror") 4 having a reflection surface of a free curved surface, i.e., not rotationally symmetric (rotationally asymmetric).

Herein, although there is shown an example of applying a transmission type, such as, a liquid crystal panel, representatively, for example, as the image display element 1 mentioned above, however the present invention should not be restricted only to this, and it may be a self-emission type, such as, a CRT, for example. Also, in case when applying the transmission type, such as, the above-mentioned liquid crystal panel or the like, for example, it is necessary to provide a lamp, to be a light source 8 for irradiating the liquid crystal panel. Also, as such the liquid crystal panel, it may be a so-called three (3) plates type, forming images of R, G and B, and in that case, it is necessary to provide a prism or the like, for use of synthesizing an image. However, an illustration is omitted herein, in particular, about the details of those liquid crystal panels and the light source 8 for irradiating them, which will be explained later, since they do not relate directly. On the other hand, with the self-emission type, such as, the CRT, it is apparent that there is no need of such the light source 8 as was mentioned above.

Within the projection optic unit having such the structures as was mentioned above, according to the present invention, the light emitted from the image display element 1 mentioned above through the prism 10 is firstly incident upon the front lens group 2 building up the lens optic system. Though the details thereof will be explained later, but this front lens group 2 is constructed with a plural number of dioptric lenses, each having a rotationally symmetric surface configuration of a positive or a negative power. Thereafter, the light emitted from this front lens group 2 passes through the rear lens group 3, which is constructed with a plural number of lenses, including a plural number (two (2) pieces in this example) of lenses, each having the sculptured or free curved surface at least on one surface thereof, i.e., not rotationally symmetric (rotationally asymmetric). And, the light emitted from this rear lens group 3, further after being reflected enlargedly, upon a reflection optic system, including the reflection mirror (hereinafter, being called "free curved (or sculptured) surface mirror") 4, having the reflection surface of the free curved surface, not rotationally symmetric, it is projected onto a predetermined screen 5 (for example, a wall surface of a room or a sheet-like screen, etc.).

However, within the present embodiment, as is apparent from this FIG. 1, differing from the optic system shifting the projection screen (i.e., the display element) into the direction perpendicular to the optical axis of the projection system, and further disposing the additional optic system inclined by a predetermined angle with respect to the optical axis of the projection system, as disclosed in the conventional art (in particular, the Japanese Patent Laying-Open No. Hei 5-134213 (1993) and the Japanese Patent Laying-Open No. 2000-162544 (2000)), the image display element 1 is so arranged that a center of the display screen thereof is approximately positioned on the optical axis of the optic system (i.e., defining a coaxial optic system). Accordingly, the light beam 11 directing to a center of the image on the screen 5, emitting from a center of the display screen of the image display element 1 and passing through a center of an entrance pupil of the lens optic system, propagates along the optical axis of the lens optic system (including the front lens group 2 and the rear lens group 3 mentioned above), approximately, (hereinafter, those will be called a "picture center light"). Thereafter, this screen center light 11, after being reflected on a point P2 upon the reflection surface 4 having the free curved surface of the reflection optic system (including the sculptured surface mirror), is incident upon a point 5 at a center of the image on the screen 5, obliquely, from a lower side with respect to a normal line 7 of the screen. Hereinafter, this angle is called an "oblique incident angle" and is presented by "θs". This means that, the light passing along the optical axis of the lens optic system is incident upon the screen, inclining to the screen, and it is substantially equal to provide the optical axis of the lens system inclining to the screen (i.e., an oblique incidence system).

However, as was mentioned above, an oblique incidence of the light upon the screen produces various kinds of aberrations, including so-called a trapezoidal distortion, i.e., an oblong configuration of projection from the image display element 1 becomes a trapezoid, and also other than that, due to the rotational asymmetry to the optical axis, etc., but according to the present invention, those are compensated upon the reflection surfaces of the rear lens group 3, which builds up the lens optic system mentioned above, and also those of the reflection optic system.

In particular, with the oblique incidence of the light projected from the image display element 1 mentioned above upon the screen 5, after being reflected upon the reflection surface of the reflection mirror 4 building up the reflection optic system mentioned above, since it enables to obtain an eccentricity (i.e., the deflection angle) much larger, being much larger comparing to that obtained through the lenses building up the lens optic system, and also it hardly produces the aberrations, therefore it is possible to suppress large-sizing of the apparatus, as well as, to obtain the wide angle of view. Thus, it is possible to build up the lens optic system, including the front lens group 2 and the rear lens group 3 mentioned above, as an optic system to be much smaller in the aperture thereof, comparing to that of the structures offsetting the additional optic system (i.e., an afocal converter) of the conventional technology mentioned above, thereby suppressing the trapezoidal distortion.

Also, since the light incident upon the reflections surface of the reflection mirror 4, which builds up the reflection optic system mentioned above, is projected while being enlarged up to a predetermined size or magnitude thereof through the lens optic system mentioned above, as was mentioned above, therefore it is easy to be manufactured, comparing to the conventional structures, building up an enlarging projection system with only the reflection mirror. Thus, the lens optic system is manufactured, separately from the reflection optic system, and thereafter it is fixed within a housing of the apparatus with adjusting the positions of both of those; i.e., obtaining the structures being suitable, in particular, for mass production thereof. Also, with such the structures of disposing the rear lens group 3 for compensating the trapezoidal distortion, etc., in front of the above-mentioned front lens group 2, as was mentioned above, since the rear lens group 3 and the front lens group 2 can be disposed while reducing the distance between them, it is possible to achieve the apparatus, being compact, as a whole thereof, mounting the said projection optic unit therein, and also to obtain a preferable effect of enabling to reduce the height, in particular, below the screen.

In this manner, combining the transmission type lens optic unit having the free curved surface and the reflection optic system having the free curved surface, in particular, in case when applying it into an image display apparatus of a front projection type, it is possible to obtain an optic system being compact, small-sizing the apparatus as a whole, while achieving the wide angle of view, which is strongly required for that front projection type, with certainty and relatively easily.

Figure 3:
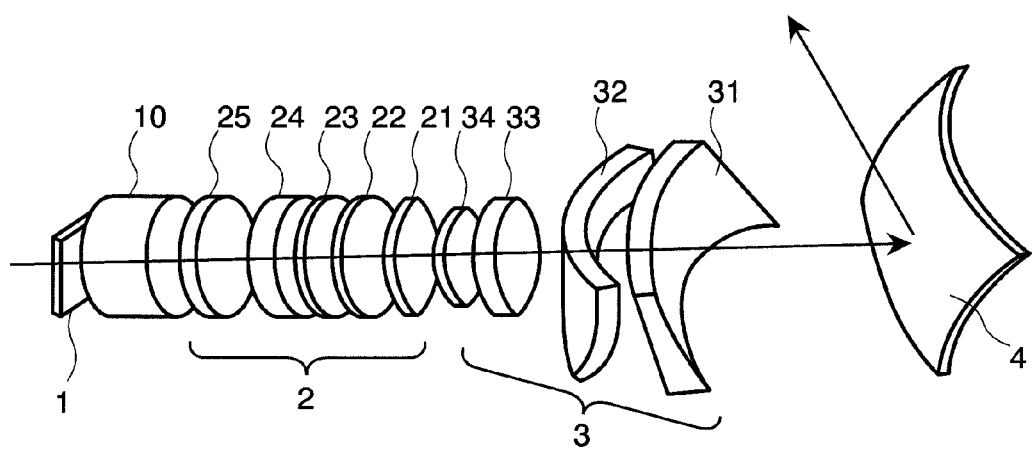
FIG. 3 is a perspective view for showing an example of an arrangement of lenses of the optic unit.
Figure 4:
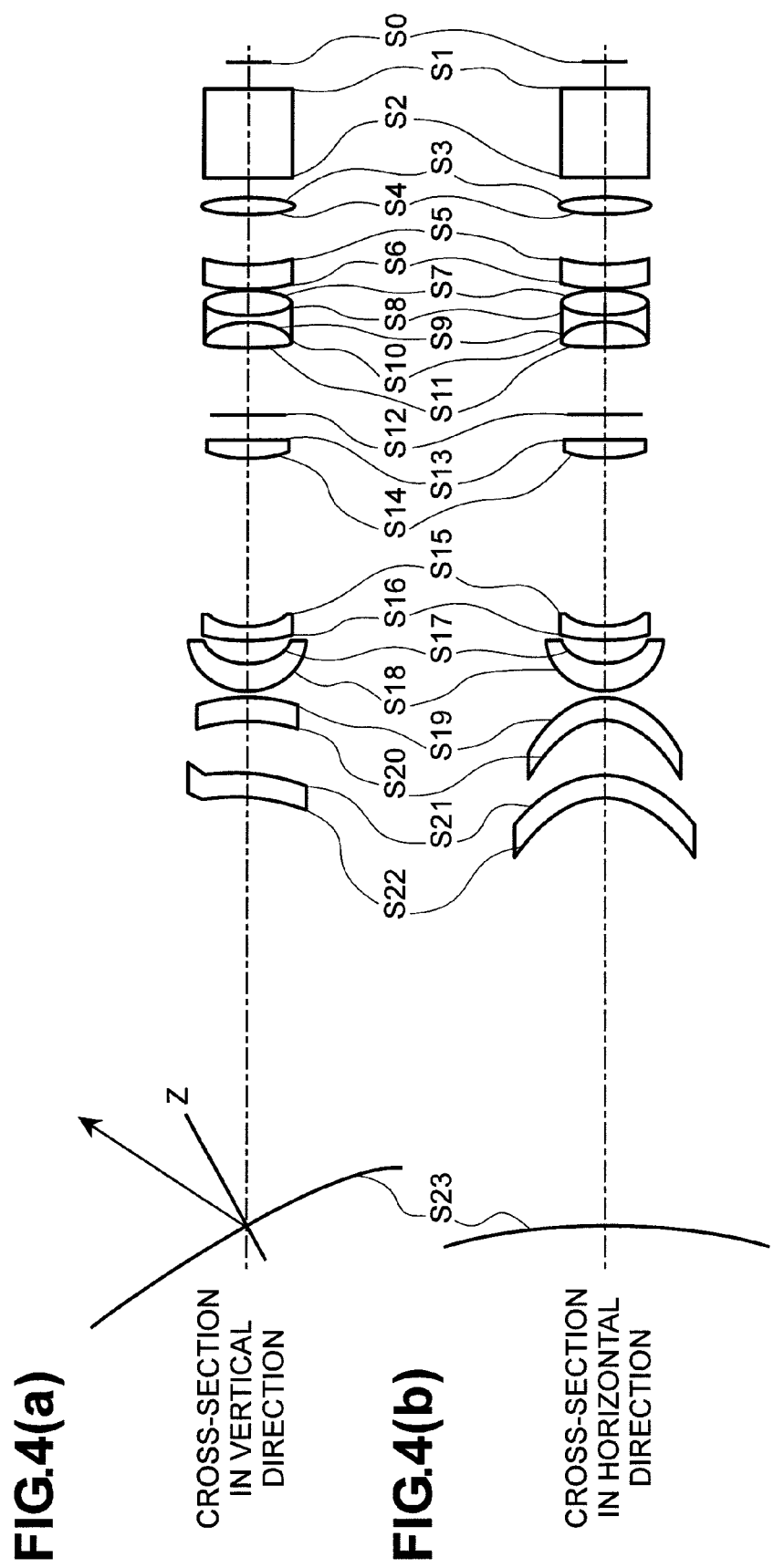
FIGS. 4(a) and 4(b) are cross-section views in the vertical direction and the horizontal direction, for explaining the lens surfaces of the optic unit.

Next, FIGS. 3 and 4(*a*) and 4(*b*) shows the lens surfaces of optical elements within the projection optic unit, including the reflection optic system therein. Thus, FIG. 3 is a perspective view of the projection optic system mentioned above, and FIG. 4(a) shows a cross-section in the vertical direction thereof, while FIG. 4(b) a cross-section in the horizontal direction thereof, respectively.

As is shown in those figures, within the lens optic system, an image emitted from the image display element 1 through the prism 10 is firstly incident upon the front lens group 2, including a plural number of lenses therein, which has the rotationally symmetric configuration. As was mentioned above, the front lens group 2 includes a spherical lens, being rotationally symmetric, and also an aspheric lens therein. Or, as will be mentioned later by referring to FIG. 5 and/or FIG. 6, a bending mirror may be disposed on the way between the front lens group 2 and the rear lens group 3, so as to bend the light at a right angle.

Also, the rear lens group 3 is constructed with at least two (2) pieces of free curved or sculptured surface lenses. As is shown in those figures, a free curved surface lens 31, nearest to the reflection surface S22 of the reflection mirror 4, directs a concave into the direction of light emission, and a curvature of a portion, where the light passes through to be incident upon a low end of that screen, is determined to be larger than that of a portion, where the light passes through to be incident upon an upper end of that screen. Thus, it is assumed that, the free curved or sculptured surface lens has such a configuration, i.e., being curved directing the concave into the direction of emission of that light, and having the curvature in the portion where the light passes through to be incident upon the low end of that screen, being larger than that in a portion where the light passes through to be incident upon the upper end of that screen.

Also, according to the present embodiment, it is constructed to fulfill the following condition. Thus, within the cross-section shown in FIG. 2 mentioned above, it is assumed that the light incident upon a point P6 at an upper end of picture on the screen 5, being emitted from a lower end of screen on the image display element 1 and passing through a center of the entrance pupil of the front lens group 2, is a light 12. It is assumed that an optical path length is "L1" for this light 12 to reach the point P6 from a point P3 where this light 12 passes through the free curved surface mirror 4. Also, it is assumed that the light incident upon a point P4 at the lower end of picture on the screen 5 is a light 13, being emitted from the upper end of screen of the image display element 1 and passing through the center of the entrance pupil of the front lens group 2. It is assumed that the optical pass length is "L2" for this light 13 to reach the point P4 from the point P1 where this light 13 passes through the free curved surface mirror 4. And, the projection optic unit mentioned above is so constructed that the "L1" and the "L2" satisfy the following equation (Eq. 1):

$$|L1-L2| < 1.2 * \sin \theta s * Dv$$

However, where "Dv" is a size of the picture on the screen, within the cross-section shown in FIG. 2, and in other words, it is a distance from the point P6 at the upper end of picture to the point P4 at the lower end thereof on the screen. Also, "θs" is the oblique incident angle mentioned above.

On the other hand, although the image display element 1 mentioned above is disposed in such a manner that the center of the display screen thereof is located on the optical axis of the lens optic system mentioned above, or alternatively, it is preferable to dispose it in such a manner that the normal line on the said display screen is inclined a little bit to the optical axis of the lens optic system mentioned above, as is shown in FIG. 7 attached herewith.

Further, judging from seeing FIG. 2, as was mentioned previously, the optical path length reaching from the point P3 to the point P6 is longer than the optical path length reaching from the point P1 to the point P4. This means that the image point P6 is farther from than the image point P4. Then, if an object point (i.e., a point in the display screen) corresponding to the image point P6 on the screen is located at a point nearer to the lens optic system and also if an object point corresponding to the image point P4 is located at a position farther from the lens optic system, it is possible to compensate the inclination of an image surface. For that purpose, as will be shown in FIG. 7, it is preferable to incline a normal line vector at a center on the display screen of the image display element 1, a little bit, with respect to the optical axis of the lens optic system, within a plane defined to include the normal line of the screen 5 and the light at the center of the screen therein. And, it is preferable that the direction of that inclination is opposite to the direction into which the screen 5 is positioned.

Further, a method for inclining an abject surface for the purpose of obtaining an image surface inclined to the optical axis, however within a practical region of the angle of view, deformations asymmetric to the optical axis are produced upon the image surface, which is obtained through the inclination of the object surface, and therefore it is difficult to make compensation by means of a projection lens, which is rotationally symmetric. According to the present embodiment, because of applying the free curved surface lens 31 and further also the free curved surface lens 32, which are rotationally asymmetric, within the rear lens group 3 mentioned above, it is possible to treat with the deformations upon the asymmetric image surface. For this reason, inclination of the object surface, i.e., the display surface of the image display element, enables to reduce the distortions of low dimensions on the image surface, greatly, and therefore it is effective for assisting the compensation of aberrations due to the free curved surface.

Next, with the function of each of the optical elements mentioned above, in particular, within the lens optic system mentioned above, the front lens group 2 (i.e., lenses 21 to 25), they build up a main lens for projecting the display screen of the image display element 1 onto the screen 5, and also compensate the basic aberrations within the optic system that is rotationally symmetric. And, the rear lens group 3 (i.e., lenses 31 to 34) within the lens optic system mentioned above, they are made up with lenses, each having the free curved surface, being not rotationally symmetric (i.e., rotationally asymmetric). Further, since the reflection optic system 4 mentioned above is built up with the reflection surfaces, each having the free curved surface configuration that is not rotationally symmetric, then it mainly compensates the aberration, which is produced due to the oblique incidence of the light. Thus, within such the structures as was mentioned above, the mirror 4 building up the reflection optic system mentioned above mainly compensates the trapezoidal distortion, while the rear lens group 3 of the lens optic system mainly compensate the asymmetric aberrations, such as, the distortion on the image surface, etc.

As was mentioned above, according to the present embodiment, the reflection optic system mentioned above is built up with one (1) piece of the reflection surface (i.e., mirror) 4 having the free curved surface configuration that is not rotationally symmetric, while the rear lens group 3 of the lens optic system mentioned above includes two (2) pieces of the transmission-type lenses (i.e., the lenses 31 and 32 on the side of reflection mirror 4), in the structures thereof. Herein, the free curved surface mirror 4 is curved directing a convex into the direction of reflection. And, a curvature on a portion of the free curved surface mirror 4, reflecting the light to be incident upon a lower end of the screen, is determined to be larger than the curvature of a portion thereof, reflecting the light to be incident upon an upper end of the screen. Or, a portion reflecting the light to be incident upon the lower end of the screen may be defined into a configuration convex to the reflecting direction of the light, on the other hand, a portion reflecting the light to be incident upon the upper end of the screen into a configuration concave to the reflecting direction thereof.

The distance between an origin of coordinates on the reflection surface (i.e., the mirror) 4 of the reflection optic system and the lens surface nearest to the reflection surface (i.e., the mirror) 4 among the front lens group 2, in the direction of the optical axis, it is preferable to be set as five (5) times large as the focus distance of the front lens group 2 or more than that. With this, it is possible to compensate the trapezoidal distortion by the reflection surface of the reflection optic system, having the free curved surface configuration, more effectively, and thereby obtaining a preferable performance.

Hereinafter, explanation will be made on the numerical values of the embodiment, according to the present embodiment.

Embodiment 1

Figure 8:
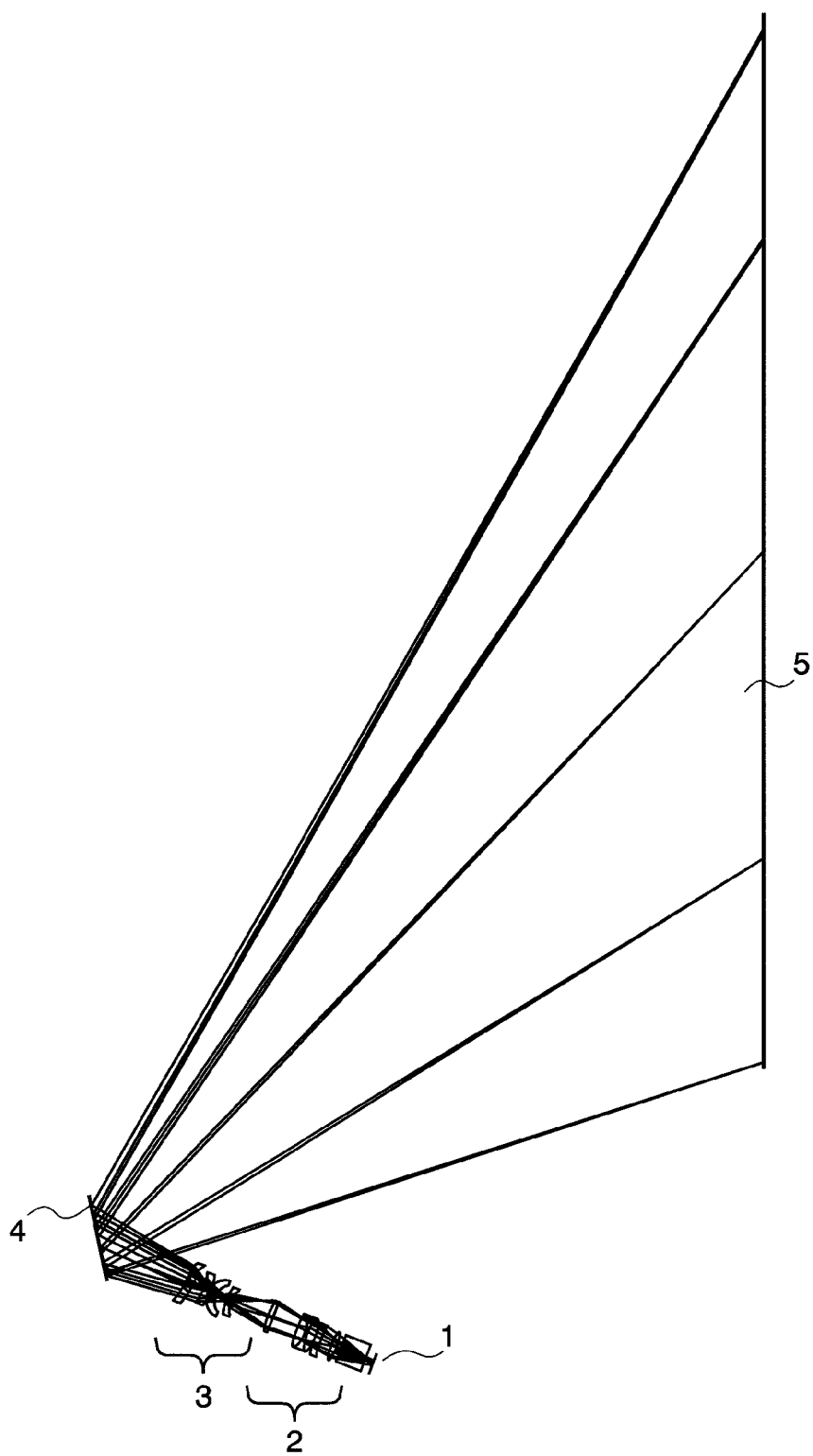
FIG. 8 is a Y-Z cross-section view for showing the optical path within the projection-type image display apparatus, according to the present invention.
Figure 9:
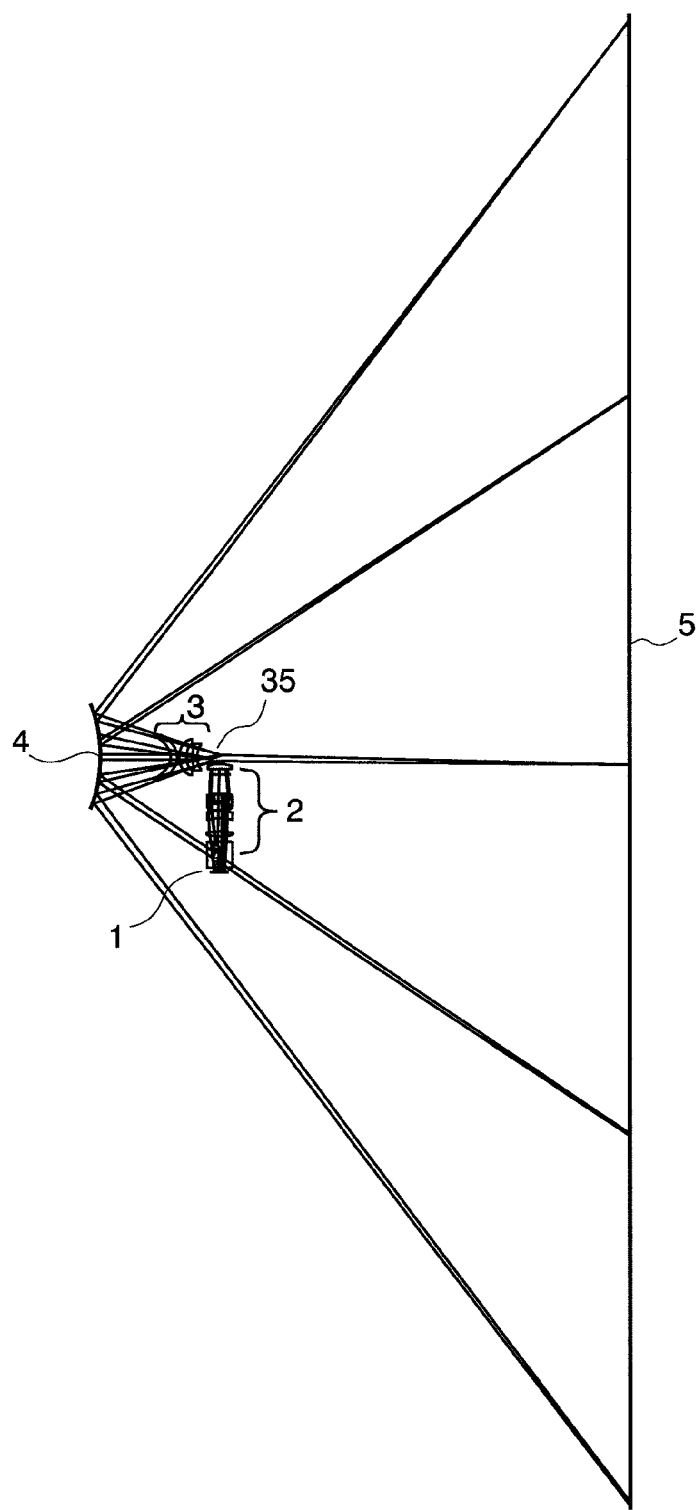
FIG. 9 is a X-Z cross-section view for showing the optical path within the projection-type image display apparatus, according to the present invention.

Firstly, explanation will be made on the details of the projection optic unit, according to the present embodiment explained in the above, by referring to FIGS. 8 and 9 attached herewith and further tables 1 to 4 below, while showing the detailed numerical values of the optical elements, including the lens optic system and the reflection optic system therein. However, FIGS. 8 and 9 attached herewith are diagrams for showing light beams in the optic system according to the present invention, upon basis of an example of first numerical values. Thus, within XYZ rectangular coordinates system shown in FIG. 2 mentioned above, FIG. 8 shows the Y-Z cross-section, i.e., extending the optic system into the Z-axis direction. Also, FIG. 9 shows the structures on X-Z cross-section. Further, this FIG. 9 shows an example of disposing the bending mirror 35 on the way between the front lens group 2 and the rear lens group 3 building up the lens optic system, as is shown in the details thereof in FIGS. 5 and 6, and thereby bending the light path into the X-axis direction, once.

In the present embodiment, the light emitted from the image display element 1, which is below in FIG. 4, firstly passes through the front lens group 2 built up with only lenses, each having only surfaces that are rotationally symmetric, among the lens optic system including the plural number of lenses therein. Then, it passes through the rear lens group 3 including the free curved surface lens that is rotationally asymmetric, and is reflected upon the reflection surface of the free curved surface mirror 4 within the reflection optic system. Thereafter, the reflecting light thereupon is incident upon the screen 5.

Herein, the front lens group 2 of the lens optic system is built up with the plural number of lenses, all of which have a refracting interface of rotationally symmetric configuration, and four (4) of the refracting interfaces of those lenses have aspheric surfaces, each being rotationally symmetric, and others have the spherical surfaces. The aspheric surface being rotationally symmetric, which is used therein, can be expressed by the following equation (Eq. 2), with using a local cylindrical coordinates system for each surface:

$$Z = \frac{cr^2}{1+\sqrt{1-(1+k)c^2r^2}} + \begin{array}{l} A \cdot r^4 + B \cdot r^6 + C \cdot r^8 + \\ D \cdot r^{10} + E \cdot r^{12} + F \cdot r^{14} + \\ G \cdot r^{16} + H \cdot r^{18} + J \cdot r^{20} \end{array}$$

Where, "r" is the distance from an optic axis, and "Z" represents an amount of sag. Also, "c" is the curvature at an apex, "k" a conical constant, "A" to "J" coefficients of a term of power of "r".

On the other hand, the free curved surfaces building up the rear lens group 3 of the lens optic system mentioned above can be expressed by the following equation (Eq. 3), including polynomials of X and Y, with applying the local coordinates system (x, y, z) assuming the apex on each surface to be the origin.

$$Z = \frac{cr^2}{1+\sqrt{1-(1+k)c^2r^2}} + \sum_m \cdot \sum_n (C(m,n) \cdot x^m \cdot y^n)$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m,n) the coefficients of the polynomials.

Next, the following table 1 shows the numerical data of the optic system, according to the present embodiment. In this table 1, S0 to S23 correspond to the marks S0 to S23 shown in FIG. 3 mentioned above, respectively. Herein, the mark S0 shows the display surface of the image display element 11, i.e., the object surface, and S23 the reflection surface of the free curved surface mirror 5. Also, though not shown in those figures, but a mark S24 shows an incident surface of the screen 5 shown in FIG. 2 mentioned above, i.e., the image surface.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17* | −27.332 | 10.00 | 1.49245 | 42.9 |
| S18* | −32.424 | 2.50 | | |
| S19# | Infinity | 8.00 | 1.49245 | 42.9 |
| S20# | Infinity | 20.51 | | |
| S21# | Infinity | 8.00 | 1.49245 | 42.9 |
| S22# | Infinity | 160.99 | | |
| S23# | Infinity | −705.00 | REFL | |

Also, in the table 1 mentioned above, "Rd" is the radius of curvature for each surface, and it is presented by a positive value in case when having a center of curvature on the left-hand side of the surface in FIG. 3 mentioned above, while by a negative value in case when having it on the right-hand side, contrary to the above. Also, "TH" is the distance between the surfaces, i.e., presenting the distance from the apex of the lens surface to the apex of the next lens surface. The distance between the surfaces is presented by a positive value in case when the next lens surface is at the left-hand side, while by a negative value in case when it is at the right-hand side, with respect to that lens surface.

Further, in the table 1 mentioned above, S5, S6, S17 and S18 are aspheric surfaces, being rotationally symmetric, and also in this table 1, they are attached with "*" beside the surface numbers for easy understanding thereof, wherein coefficients of the aspheric surface of those four (4) surfaces are shown in the table 2 below.

TABLE 2

| Surface | | | | Aspheric Surface Coefficients | | | | |
|---|---|---|---|---|---|---|---|---|
| S5  | K | −11.7678542  | C | −1.159E−11 | F | 2.298642E−20 | J | −1.255E−26 |
|     | A | −2.7881E−06  | D | −3.2834E−14 | G | 1.05201E−21 | | |
|     | B | 9.67791E−09  | E | 1.09359E−16 | H | 1.96001E−24 | | |
| S6  | K | −5.4064901   | C | 2.0324E−12 | F | 3.0211E−19 | J | −1.4982E−26 |
|     | A | 6.14967E−07  | D | −2.2078E−14 | G | 4.30049E−22 | | |
|     | B | 4.60362E−09  | E | −8.0538E−17 | H | 4.79618E−24 | | |
| S17 | K | 1.106429122  | C | −9.0262E−11 | F | −1.0521E−18 | J | −6.0837E−26 |
|     | A | −1.1068E−05  | D | −1.3984E−13 | G | −8.1239E−23 | | |
|     | B | 7.21301E−08  | E | 3.1153E−16 | H | 3.86174E−23 | | |
| S18 | K | 0.742867686  | C | −2.2719E−11 | F | 1.09398E−19 | J | 9.02232E−29 |
|     | A | 1.51788E−07  | D | −4.6853E−14 | G | 1.62146E−22 | | |
|     | B | 2.10472E−08  | E | 2.9666E−17 | H | −3.0801E−25 | | |

Also, S19 to S22 in the table 1 mentioned above are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the table 3 below.

TABLE 3

| Surface | | | | Aspheric Surface Coefficients | | | | |
|---|---|---|---|---|---|---|---|---|
| S19 | | | C17 | 5.38933E−07 | C34 | −1.2381E−09 | C51 | −7.4126E−14 |
|     | K | 0 | C19 | 8.33432E−07 | C36 | 1.13944E−09 | C53 | 2.05074E−12 |
|     | C4 | 0.013500584 | C21 | −4.6367E−08 | C37 | 3.87771E−12 | C55 | −9.2166E−13 |
|     | C6 | 0.003493312 | C22 | −6.2643E−09 | C39 | 1.04779E−11 | C56 | −2.5867E−15 |
|     | C8 | −0.00083921 | C24 | −2.2449E−08 | C41 | 1.80038E−11 | C58 | −8.7122E−15 |
|     | C10 | −0.00032098 | C26 | −5.6706E−08 | C43 | 5.23019E−11 | C60 | 2.85321E−14 |
|     | C11 | 8.59459E−06 | C28 | 9.69952E−10 | C45 | 1.69253E−11 | C62 | −8.5084E−14 |
|     | C13 | 2.14814E−06 | C30 | −1.1968E−10 | C47 | −2.7E−14 | C64 | 1.25198E−13 |
|     | C15 | 7.54355E−06 | C32 | −1.3638E−09 | C49 | 7.30978E−13 | C66 | −5.6277E−14 |
| S20 | | | C17 | 7.49262E−07 | C34 | −5.7462E−10 | C51 | −3.6141E−13 |
|     | K | 0 | C19 | 1.19039E−06 | C36 | 1.27396E−09 | C53 | 8.54188E−14 |
|     | C4 | 0.015488689 | C21 | −1.2953E−07 | C37 | −4.7746E−12 | C55 | −5.3469E−13 |
|     | C6 | 0.006553414 | C22 | 5.115E−10 | C39 | 7.32855E−12 | C56 | 8.92545E−17 |
|     | C8 | −0.00116756 | C24 | −2.1936E−08 | C41 | 5.30157E−11 | C58 | −5.3434E−15 |
|     | C10 | −0.00033579 | C26 | −5.9543E−08 | C43 | 5.05014E−11 | C60 | 1.96533E−14 |
|     | C11 | 7.5015E−06 | C28 | 2.03972E−08 | C45 | −2.1894E−11 | C62 | −1.3923E−13 |
|     | C13 | −2.5728E−06 | C30 | 1.16701E−11 | C47 | −1.2515E−13 | C64 | 1.06322E−13 |
|     | C15 | −1.3543E−06 | C32 | −1.6198E−09 | C49 | 7.64489E−13 | C66 | −4.6602E−15 |
| S21 | | | C17 | −1.0379E−07 | C34 | 2.81743E−10 | C51 | −8.1775E−15 |
|     | K | 0 | C19 | 3.0082E−08 | C36 | 6.05663E−10 | C53 | 3.06022E−14 |
|     | C4 | 0.015096874 | C21 | 7.95521E−08 | C37 | 8.39381E−13 | C55 | −9.1775E−13 |
|     | C6 | 0.009982808 | C22 | −1.3911E−09 | C39 | 1.98531E−12 | C56 | −7.8543E−17 |
|     | C8 | 0.000358347 | C24 | 9.33292E−10 | C41 | 1.37477E−11 | C58 | −8.9588E−16 |
|     | C10 | 0.000209267 | C26 | 3.54468E−09 | C43 | −1.0671E−11 | C60 | −6.0768E−15 |
|     | C11 | −3.8593E−07 | C28 | 4.1615E−09 | C45 | 9.04109E−12 | C62 | −1.9528E−14 |
|     | C13 | −6.8336E−06 | C30 | −1.2331E−11 | C47 | 2.48401E−14 | C64 | 2.6781E−14 |
|     | C15 | −2.2455E−05 | C32 | −2.3367E−10 | C49 | 6.92603E−14 | C66 | −1.4324E−14 |
| S22 | | | C17 | −3.6973E−07 | C34 | 4.8045E−10 | C51 | −2.9795E−13 |
|     | K | 0 | C19 | −3.0682E−07 | C36 | 1.43328E−10 | C53 | −2.5306E−14 |
|     | C4 | 0.022813527 | C21 | 4.12093E−08 | C37 | −2.0707E−12 | C55 | −3.9401E−13 |
|     | C6 | 0.012060543 | C22 | 4.07969E−09 | C39 | −4.9221E−12 | C56 | 6.88651E−16 |
|     | C8 | 0.000638931 | C24 | 8.5986E−09 | C41 | −2.3681E−12 | C58 | 1.55006E−15 |

TABLE 3-continued

| Surface | | | | | | | | |
|---|---|---|---|---|---|---|---|---|
| | | | | Aspheric Surface Coefficients | | | | |
| | C10 | 0.000196027 | C26 | 2.1713E−08 | C43 | −2.1567E−11 | C60 | −1.4674E−15 |
| | C11 | −7.1204E−06 | C28 | 1.63499E−08 | C45 | −2.3679E−12 | C62 | −9.9822E−15 |
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |
| S23 | | | C17 | −1.1083E−09 | C34 | −4.9118E−14 | C51 | −5.4918E−19 |
| | K | 0 | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

Figure 7:
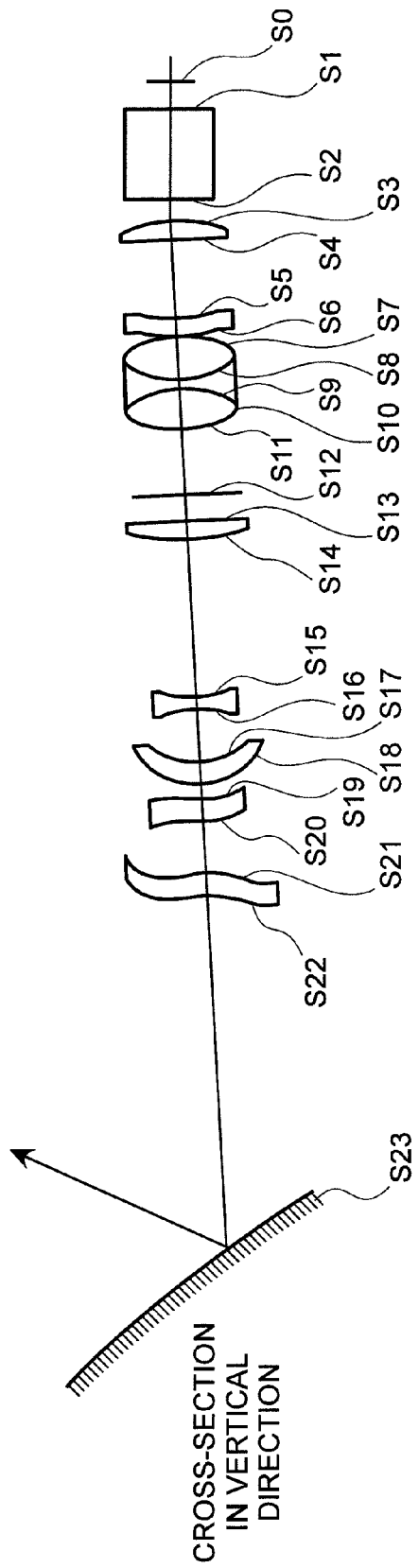
FIG. 7 is a cross-section view in the vertical direction, for explaining the lens surfaces of the optic unit.

Also, according to the present invention, as is shown in FIG. 7, the object surface, i.e., the display screen of the image display element 1 is inclined by −1.163 degrees to the optical axis of the lens optic system mentioned above. However, with the direction of inclination, it is assumed that a positive value presents the direction, in which the normal line on the object surface rotates into the clockwise direction within the cross-section shown this FIG. 7. Accordingly, according to the present embodiment, it means that, within the cross-section shown in FIG. 7, the object surface is inclined into the anti-clockwise direction by 1.163 degrees from the position perpendicular to the optical axis of the lens optic system mentioned above.

Also, the free curved surface mirror 4 shown by the mark S23 in FIGS. 3 and 7 mentioned above is so disposed that, the normal line at the origin of the local coordinates thereof, i.e., the Z-axis is inclined by around +29 degree from the position in parallel with the optical axis of the lens optic system mentioned above while positioning that origin of the local coordinates on the optical axis of the lens optic system mentioned above. However, the direction of this inclination is assumed to be positive in the anti-clockwise rotating direction, within the cross-sections shown in FIGS. 3 and 7, similar to that of the object surface mentioned above, and therefore, it is inclined into the anti-clockwise rotation. With this, the light at the center of the screen, emitting from the center on the screen of the image display element 1 and propagating almost along the optical axis of the lens optic system mentioned above, after reflection upon S23, it propagates into a direction inclined by 58 degrees, i.e., 2 times large as the inclination angle with respect to the optical axis of the lens optic system mentioned above (see an arrow in the figure).

Further, in the present embodiment, the conditions of the inclination and an offset of the local coordinates are shown in the table 4 below, on each of the surfaces. In this table 4, values of the inclination angle and the offset are shown on the columns on the right-hand sides of the surface number, wherein "ADE" is a magnitude of the inclination within the surface in parallel with the cross-section of FIG. 4, and a rule of display thereof is as mentioned above. Also, "YDE" is a magnitude of the offset, and the offset is set up into the direction perpendicular to the optical axis within the surface in parallel with the cross-section of FIG. 4, and the offset below on the cross-section of FIG. 4 is assumed to be positive. However, also in the embodiments that will be explained hereinafter, the inclination and the offset of an optical element are setup to be the direction within the cross-section in parallel with the cross-section shown therein.

TABLE 4

| Surface | ADE (°) | YDE (mm) |
|---|---|---|
| S0 | −1.163 | 0.0 |
| S23 | 29.000 | 0.0 |

However, as be seen from the tables 1 and 3 mentioned above, according to the present embodiment, it is apparent that the curvature "c" and the conic coefficients "k" are "0". Thus, the trapezoidal distortion, being generated due to the oblique incidence, is extremely large in the direction of the oblique incidence, but the amount thereof is small in the direction perpendicular to this. Accordingly, between the direction of the oblique incidence and the direction perpendicular to this, there must be provided functions greatly different from each other, and it is possible to compensate or correct the asymmetric aberration, preferably, without using the curvature "c" nor the conic coefficient "k", being rotationally symmetric and functioning in all directions.

Also, in the table 4 mentioned above, "ADE" of the surface S23 is same to "θm" shown in FIG. 2, and "ADE" on the surface of the screen 5 is "θs", as is shown in FIG. 2 mentioned above. From the values of both of those, the condition mentioned above is satisfied or fulfilled, and therefore, there can be achieved an optic system, being compact, i.e., reducing the height below the screen.

Figure 10:
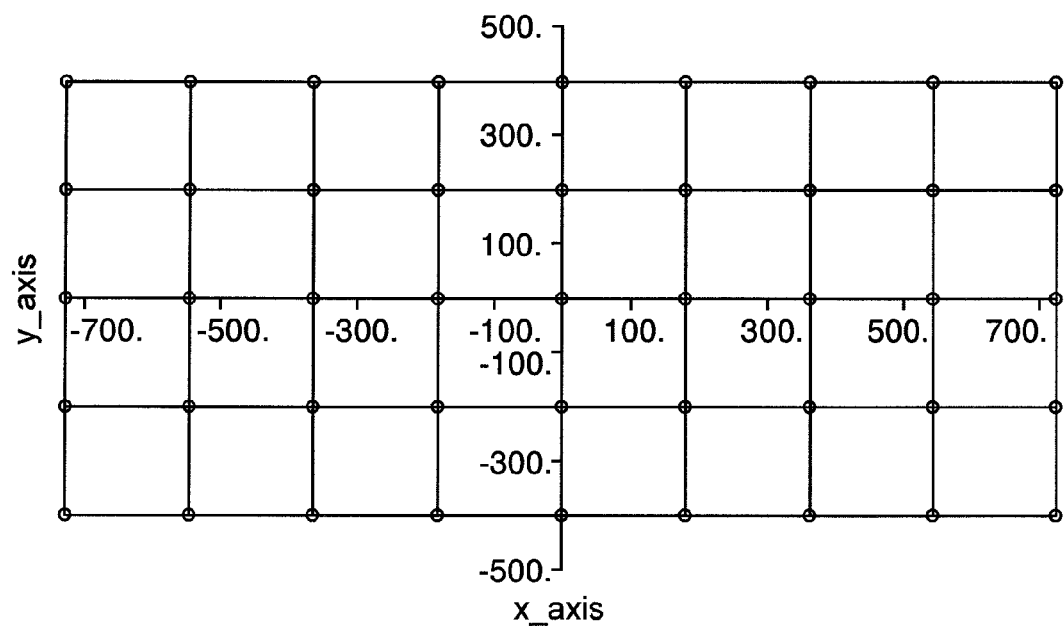
FIG. 10 is a view for showing the distortion power of the optic unit, according to an embodiment 1.

Also, since the value of the difference |L1−L2| of the optical pat, which is shown by the equation (Eq. 1) mentioned above, is 0.42 times large as the height of picture on the screen, and "θs" is 30 degrees, then the condition of the (Eq. 1) mentioned above is satisfied. The numerical values in the tables 1 to 4 are of the case when projecting the image of the region (12.16×0.84 mm) on the object surface (on a liquid crystal panel of a ration 16:9), enlargedly, upon a screen (60"+over-scan: 1452.8×817.2 mm). The distortion of that instance is shown in FIG. 10. The vertical direction in this FIG. 10 corresponds to the vertical direction shown in FIG. 8 mentioned above, and also corresponds to the direction of Y-axis in FIG. 2 mentioned above. And, the horizontal direction in this FIG. 8 corresponds to the direction perpendicular to the Y-axis on the screen, and a central portion of the oblong in the figure corresponds to the center of the screen. Further, this FIG. 10 shows the condition of curvature of each of straight lines, in particular, when displaying the screen while dividing it into four (4) in the vertical direction and eight (8) in the horizontal direction, and thereby showing the state or condition of graphic distortion.

Figure 11:
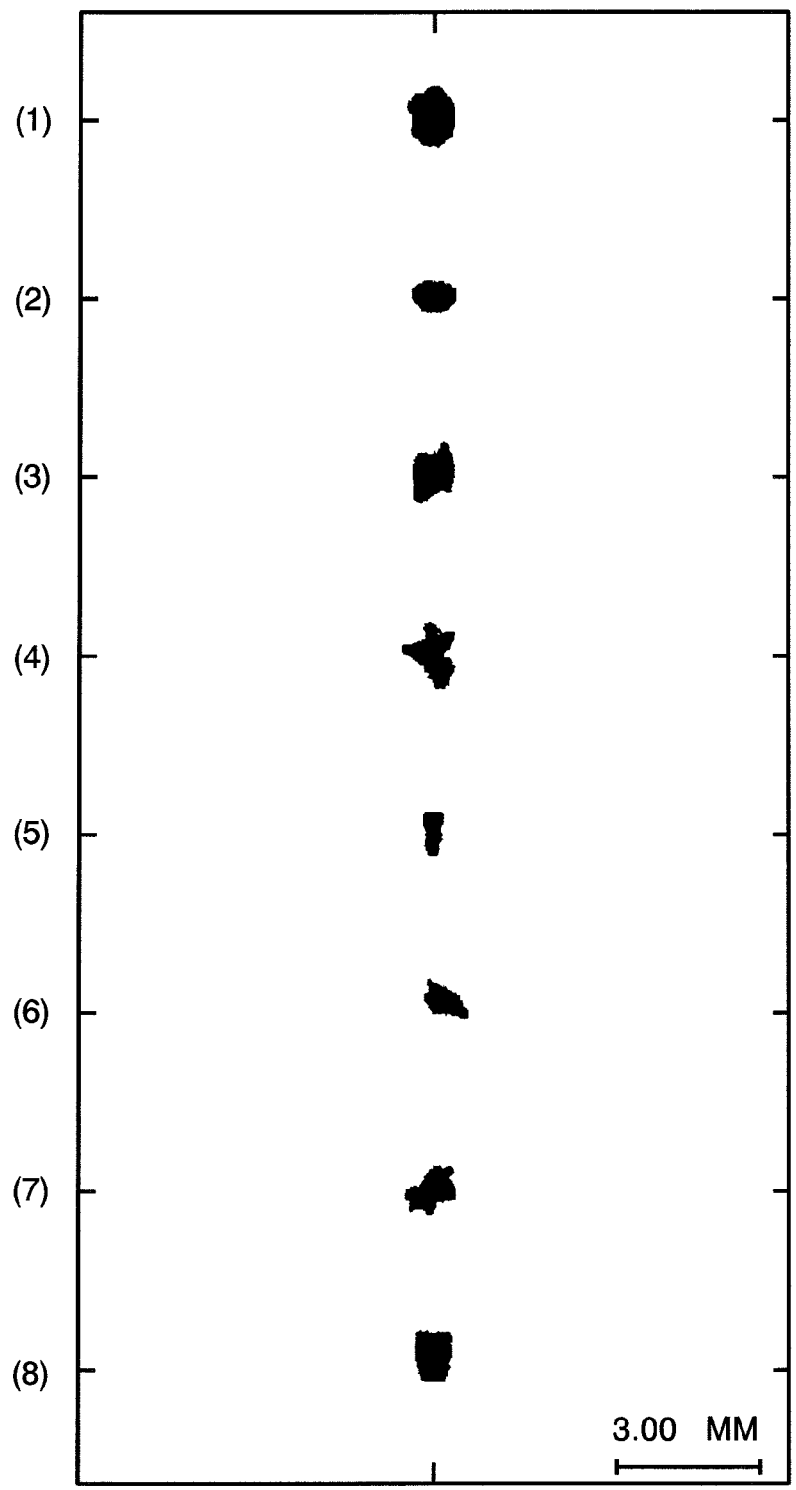
FIG. 11 is a view for showing the spot power of the optic unit, according to the embodiment 1.

Further, spot diagrams are shown in FIG. 11 attached herewith. In this FIG. 11 are shown the spot diagram of the light flux emitting from eight (8) points on the display screen of the image display element 5; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). However, the unit thereof is "mm". The horizontal direction of each spot diagram corresponds to the X direction on the screen, while the vertical direction the Y direction on the screen. Both show that they maintain preferable performances.

In addition thereto, in case when assuming that the size is "Lo" of the projection image, which is obtained by the above-mentioned (for example, the screen 5 shown in FIG. 1), in the diagonal direction thereof, and that the distance is "Lp" from the center of the free curved surface mirror 4 up to the projection image (see FIG. 1 mentioned above), since Lo=1,524 mm, Lp=700×cos 45°□495 mm, then the ratio between them comes to be greater than two (L0/Lp>2), therefore it can be seen that an object surface can be projected, enlargedly, onto the screen, being sufficiently large, even with a relatively near distance; i.e., being superior in the ratio of enlarged projection.

Embodiment 2

Next, explanation will be made of a second embodiment by referring to FIGS. 12 and 13 and tables 5 to 8. Herein, the front lens group 2 of the lens optic system is built up with the plural number of lenses, all of which have a refracting interface of rotationally symmetric configuration, and four (4) of the refracting interfaces of those lenses have aspheric surfaces, each being rotationally symmetric, and others have the spherical surfaces. The aspheric surface being rotationally symmetric, which is used therein, can be expressed by the equation (Eq. 2) mentioned above, with using a local cylindrical coordinates system for each surface.

Also, the free curved surfaces building up the rear lens group 3 of the lens optic system mentioned above can be expressed by the equation (Eq. 3) mentioned above, including polynomials of X and Y, with applying the local coordinates system (x, y, z) assuming the apex on each surface to be the origin.

The following table 5 shows lends data of the present embodiment including numerical values thereof, wherein the surface numbers starting from S0, presenting the object surfaces, sequentially, further from S1 to S23. In this table 1, "Rd" is also the radius of curvature for each surface, and "TH" is the distance between the surfaces, i.e., presenting the distance from the apex of the lens surface to the apex of the next lens surface.

TABLE 5

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.65 | | |
| S3 | 210.000 | 4.65 | 1.85306 | 17.2 |
| S4 | −92.276 | 18.00 | | |
| S5* | −119.154 | 9.00 | 1.49245 | 42.9 |
| S6* | −99.255 | 0.10 | | |
| S7 | 41.651 | 9.32 | 1.69811 | 60.9 |
| S8 | −43.298 | 2.50 | 1.76014 | 20.0 |
| S9 | 29.535 | 0.10 | | |
| S10 | 29.472 | 9.00 | 1.49811 | 60.9 |
| S11 | −81.846 | 25.90 | | |
| S12 | Infinity | 9.10 | | |
| S13 | −259.960 | 6.00 | 1.85306 | 17.2 |
| S14 | −54.061 | 65.00 | | |
| S15 | −24.878 | 4.19 | 1.74702 | 33.2 |
| S16 | −64.884 | 9.00 | | |
| S17* | −20.009 | 10.00 | 1.49245 | 42.9 |
| S18* | −28.982 | 2.50 | | |
| S19# | Infinity | 8.00 | 1.49245 | 42.9 |
| S20# | Infinity | 20.51 | | |
| S21# | Infinity | 8.00 | 1.49245 | 42.9 |
| S22# | Infinity | 159.95 | | |
| S23# | Infinity | −852.00 | REFL | |

In the table 5 mentioned above, S5, S6, S17 and S18 are aspheric surfaces, being rotationally symmetric, and also in this table 5, they are attached with "*" beside the surface numbers for easy understanding thereof, wherein coefficients of the aspheric surface of those four (4) surfaces are shown in the table 6 below.

TABLE 6

| Surface | | | Aspheric Surface Coefficients | | | | | |
|---|---|---|---|---|---|---|---|---|
| S5 | K | −23.3033479 | C | −9.6351E−12 | F | 6.40059E−20 | J | 5.14145E−27 |
| | A | −2.4809E−06 | D | −3.1244E−14 | G | −2.06E−22 | | |
| | B | 6.68597E−09 | E | 1.70809E−16 | H | −1.9587E−24 | | |
| S6 | K | −7.9521673 | C | −2.8461E−12 | F | 1.68916E−19 | J | −4.2604E−27 |
| | A | 8.81129E−07 | D | −4.2436E−16 | G | −4.7764E−22 | | |
| | B | 3.27597E−09 | E | −2.4174E−17 | H | 3.1265E−24 | | |
| S17 | K | 1.294916014 | C | −9.1246E−11 | F | −8.1666E−19 | J | −9.4083E−26 |
| | A | −1.7719E−05 | D | −1.8651E−13 | G | −7.81036E−22 | | |
| | B | 5.73314E−08 | E | 2.9427E−16 | H | 3.77766E−23 | | |
| S18 | K | 0.463935076 | C | −1.1724E−11 | F | 1.23091E−19 | J | −2.0819E−28 |
| | A | −3.417E−06 | D | −5.4303E−14 | G | 1.99428E−22 | | |
| | B | 1.57331E−08 | E | 1.37371E−17 | H | −3.49141E−25 | | |

Also, S19 to S22 in the table 5 mentioned above are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the table 7 below.

TABLE 7

| Surface | | | | Free curved Surface Coefficients | | | |
|---|---|---|---|---|---|---|---|
| S19 | | | C17 | 5.06259E−07 | C34 | −1.4837E−09 | C51 | −1.0027E−12 |
| | K | 0 | C19 | 4.85077E−07 | C36 | 1.31263E−09 | C53 | 6.99745E−13 |
| | C4 | 0.017559144 | C21 | −1.5853E−07 | C37 | 1.83299E−12 | C55 | −1.6619E−12 |
| | C6 | 0.001733207 | C22 | −5.42E−09 | C39 | −4.3583E−13 | C56 | −1.9766E−15 |
| | C8 | −0.00066382 | C24 | −1.5702E−08 | C41 | 2.72981E−11 | C58 | 1.40369E−15 |
| | C10 | −0.00013226 | C26 | −5.9063E−08 | C43 | 3.0878E−11 | C60 | 1.05828E−14 |
| | C11 | 8.28618E−06 | C28 | −7.7982E−09 | C45 | 2.26152E−11 | C62 | −8.9296E−14 |
| | C13 | 1.03545E−06 | C30 | −1.0233E−10 | C47 | 2.99348E−14 | C64 | 7.84407E−14 |
| | C15 | 8.99822E−06 | C32 | −8.8036E−07 | C49 | 4.57827E−13 | C66 | −9.1078E−14 |
| S20 | | | C17 | 7.92636E−07 | C34 | −1.6758E−09 | C51 | −3.5813E−13 |
| | K | 0 | C19 | 8.89146E−06 | C36 | 1.45469E−09 | C53 | 6.84539E−13 |
| | C4 | 0.021458089 | C21 | −1.4324E−07 | C37 | −7.7649E−12 | C55 | −1.511E−12 |
| | C6 | 0.004154169 | C22 | −1.0382E−09 | C39 | −2.0012E−12 | C56 | 1.77674E−15 |
| | C8 | −0.00099953 | C24 | −1.4146E−08 | C41 | 5.28532E−11 | C58 | 5.96659E−15 |
| | C10 | −0.00011911 | C26 | −5.677E−08 | C43 | 2.30872E−11 | C60 | −2.0891E−15 |
| | C11 | 8.42605E−06 | C28 | 6.05026E−09 | C45 | 1.03045E−11 | C62 | −9.4541E−14 |
| | C13 | −6.6069E−06 | C30 | 2.65443E−11 | C47 | −1.2622E−13 | C64 | 1.01913E−13 |
| | C15 | −3.2455E−07 | C32 | −1.5185E−09 | C49 | 7.4513E−13 | C66 | −8.0588E−15 |
| S21 | | | C17 | −1.0996E−07 | C34 | 6.726E−11 | C51 | −1.0707E−13 |
| | K | 0 | C19 | 1.27907E−07 | C36 | 7.7809E−10 | C53 | −6.8789E−14 |
| | C4 | 0.016481821 | C21 | 1.59073E−07 | C37 | 1.78369E−12 | C55 | −1.3595E−12 |
| | C6 | 0.009814027 | C22 | −2.3156E−09 | C39 | 5.1641E−12 | C56 | −4.5963E−16 |
| | C8 | 0.000360473 | C24 | −1.533E−10 | C41 | 1.45879E−11 | C58 | −1.5431E−16 |
| | C10 | 0.000256882 | C26 | 6.12508E−09 | C43 | 4.21499E−12 | C60 | −9.4112E−15 |
| | C11 | −1.2641E−06 | C28 | 4.69033E−09 | C45 | 2.24112E−11 | C62 | −1.7181E−14 |
| | C13 | −7.1071E−06 | C30 | −3.0818E−11 | C47 | 5.4765E−14 | C64 | 1.14179E−14 |
| | C15 | −2.6709E−05 | C32 | −3.7474E−10 | C49 | 3.77477E−14 | C66 | −1.4481E−14 |
| S22 | | | C17 | −4.2509E−07 | C34 | 6.03428E−10 | C51 | −4.5666E−13 |
| | K | 0 | C19 | −2.8996E−07 | C36 | 2.79273E−10 | C53 | −1.1058E−13 |
| | C4 | 0.024865431 | C21 | 1.2041E−08 | C37 | −1.9296E−12 | C55 | −5.1945E−13 |
| | C6 | 0.013574823 | C22 | 4.59025E−09 | C39 | −4.3532E−12 | C56 | 5.15206E−16 |
| | C8 | 0.000656946 | C24 | 9.31761E−09 | C41 | −1.0393E−11 | C58 | 1.80646E−15 |
| | C10 | 0.00023588 | C26 | 3.01345E−08 | C43 | −1.737E−11 | C60 | −1.4435E−16 |
| | C11 | −9.5439E−06 | C28 | 2.56904E−08 | C45 | −6.9004E−13 | C62 | −1.1182E−14 |
| | C13 | −1.3485E−05 | C30 | 1.87694E−10 | C47 | −2.2366E−16 | C64 | 1.55635E−14 |
| | C15 | −3.0664E−05 | C32 | 1.26944E−10 | C49 | −1.2748E−13 | C66 | −1.4201E−14 |
| S23 | | | C17 | −9.3593E−10 | C34 | −4.9686E−14 | C51 | 1.8026E−18 |
| | K | 0 | C19 | −6.409E−10 | C36 | −5.1319E−14 | C53 | −8.6197E−18 |
| | C4 | 0.001494744 | C21 | 3.91751E−10 | C37 | −8.103E−17 | C55 | 1.1354E−17 |
| | C6 | 0.001287983 | C22 | 1.80884E−12 | C39 | 5.19251E−16 | C56 | 1.89778E−21 |
| | C8 | 1.19776E−05 | C24 | −8.191E−12 | C41 | 1.38639E−16 | C58 | −1.6083E−20 |
| | C10 | 1.18228E−05 | C26 | −7.7154E−12 | C43 | −9.0016E−16 | C60 | 9.98054E−21 |
| | C11 | −4.3922E−08 | C28 | 9.92084E−14 | C45 | 2.67935E−16 | C62 | 4.42337E−21 |
| | C13 | 3.28597E−08 | C30 | 4.90899E−14 | C47 | −1.5465E−18 | C64 | −1.4286E−20 |
| | C15 | 8.20779E−08 | C32 | −1.3332E−14 | C49 | 1.58291E−18 | C66 | 6.04404E−21 |

Further, in the following table 8 are shown the inclination of each surface and magnitude of eccentricity according to the second embodiment. In this table 8, the definitions for showing the values of "ADE" and "YDE" are as was mentioned above. The inclination of each surface according to the present embodiment is almost same to that of the previous embodiment 1.

TABLE 8

| Surface | ADE (°) | YDE (mm) |
|---|---|---|
| S0 | −1.289 | 0.0 |
| S15 | 0.0 | −0.193 |
| S17 | 0.0 | 0.193 |
| S23 | 28.814 | 0.0 |

Further, in the table 8 mentioned above, from the "ADE(=θm)" of S23 and the "ADE(=θs)" of the screen surface 5, it is apparent that a compact optic system can be achieved, being small in the height below the screen, while fulfilling the condition mentioned above. Also, since the value of the difference |L1−L2| of the optical pat, which is shown by the equation (Eq. 1) mentioned above, is 0.43 times large as the height of picture on the screen, and "θs" is 30 degrees, then the condition of the (Eq. 1) mentioned above is satisfied.

On the other hand, in this second embodiment, as is shown in the table 8 mentioned above, S15 is shifted or offset by −0.193 mm, on the contrary thereto, the surface S17 is shifted or offset by 0.193 mm. In case when offsetting a certain surface, the optical axis is shifted by an amount of offsetting on the surfaces thereafter. Accordingly, the offsetting on this S15 and S17 means that one (1) piece of lens, which is made up with the surfaces S15 and S16, is offset by −0.193 mm from the optical axis. This amount of offsetting is very small, and it does not cause ill influence, such as, enlarging the size of the lens, for example. This eccentricity enables to achieve a fine adjustment on asymmetric chromatic aberration (or chromatism).

Also, as can be seen from the tables 4 and 6 mentioned above, according to the present embodiment, it is apparent that the curvature "c" and the conic coefficients "k" are "0". Thus, the trapezoidal distortion, being generated due to the oblique incidence, is extremely large in the direction of the oblique incidence, but the amount thereof is small in the direction perpendicular to this. Accordingly, between the direction of the oblique incidence and the direction perpendicular to this, there must be provided functions greatly different from each other, and it is possible to compensate or correct the asymmetric aberration, preferably, without using the curvature "c" nor the conic coefficient "k", being rotationally symmetric and functioning in all directions.

Figure 12:
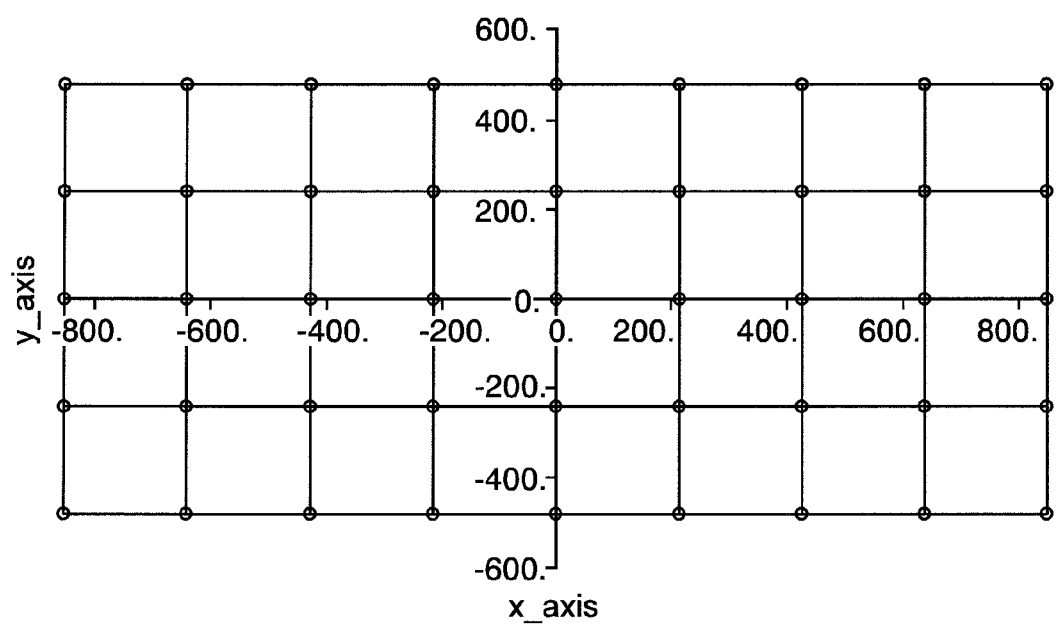
FIG. 12 is a view for showing the distortion power of the optic unit, according to an embodiment 2.

As an effective region of the second embodiment with such the numerical values mentioned above, the region on the object surface (ratio=16:9) is projected, enlargedly, upon the image surface (70"+over-scan:1694.9×953.4 mm), and the graphic distortion of that is shown in FIG. 12. The vertical direction in this FIG. 12 corresponds to the vertical direction shown in FIG. 2, and the Y-axis. The horizontal direction in this FIG. 12 corresponds to the direction perpendicular to the Y axis on the screen, and a central portion of the oblong in the figure corresponds to the center of the screen. Further, this shows the condition of curvature of each of straight lines, in particular, when displaying the screen while dividing it into four (4) in the vertical direction and eight (8) in the horizontal direction, and thereby showing the state or condition of graphic distortion.

Figure 13:
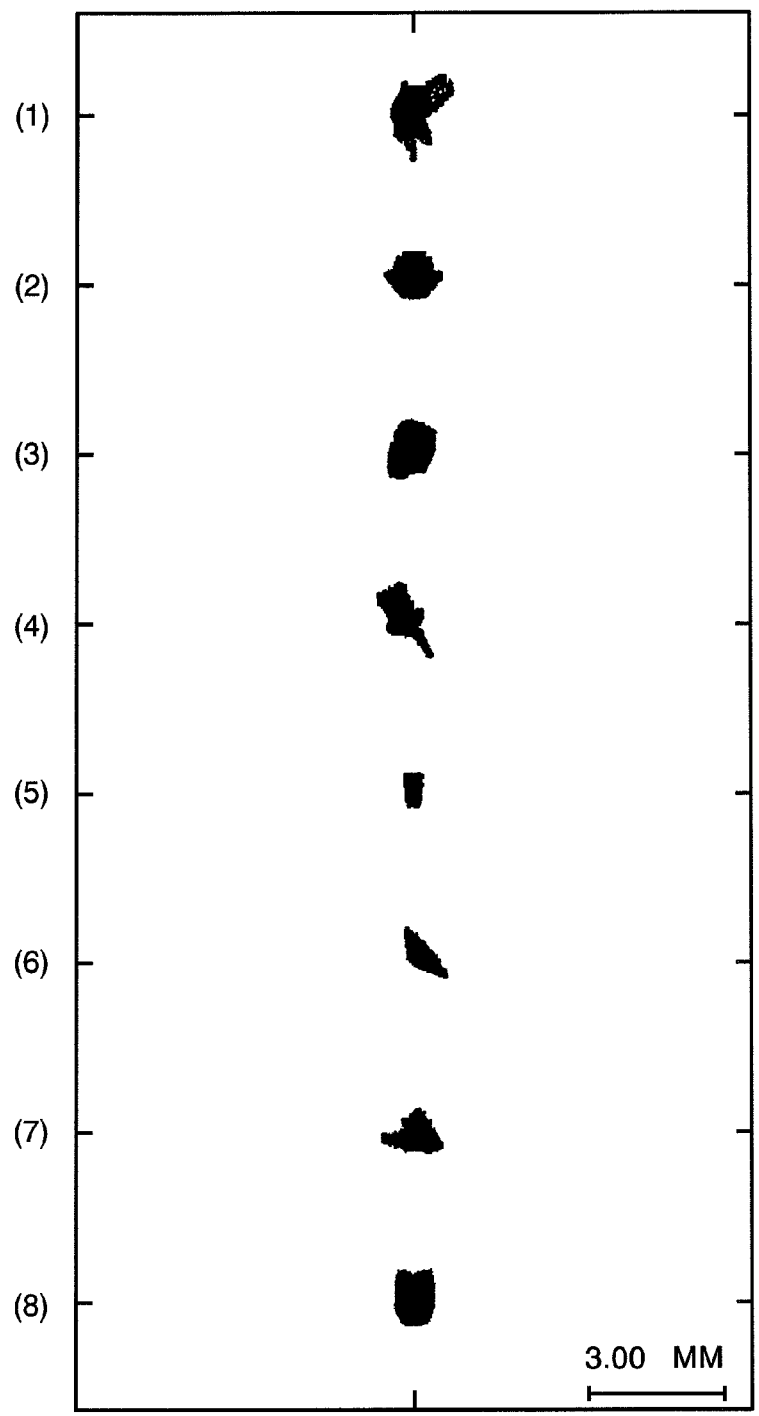
FIG. 13 is a view for showing the spot power of the optic unit, according to the embodiment 2.

Further, FIG. 13 shows spot diagrams according to the second embodiment. In this FIG. 13 are shown the spot diagram of the light flux emitting from eight (8) points on the display screen of the image display element 61; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). The unit thereof is "mm". The horizontal direction of each spot diagram corresponds to the X direction on the screen, while the vertical direction the Y direction on the screen. Thus, it is apparent that both of those maintain preferable performances.

Also, in this example, assuming that the size is "Lo" of the projection image obtained through the mentioned above, in the diagonal direction thereof and the distance is "Lp" from the center of the free curved surface mirror 4 up to the projection image, since Lo=1,524 mm, Lp=700×cos 45°≈495 mm, then the ratio between them comes to be greater than two (L0/Lp>2), therefore it can be seen that an object surface can be projected, enlargedly, onto the screen, being sufficiently large, even with a relatively near distance; i.e., being superior in the ratio of enlarged projection.

Embodiment 3

Next, explanation will be made of a third embodiment, according to the present invention, by referring to FIGS. 14 and 15 and tables 9 to 12. Herein, also the front lens group 2 of the lens optic system is built up with the plural number of lenses, all of which have a refracting interface of rotationally symmetric configuration, and four (4) of the refracting interfaces of those lenses have aspheric surfaces, each being rotationally symmetric, and others have the spherical surfaces. The aspheric surface being rotationally symmetric, which is used therein, can be expressed by the equation (Eq. 2) mentioned above, with using a local cylindrical coordinates system for each surface.

The free curved surfaces building up the rear lens group 3 of the lens optic system mentioned above can be expressed by the equation (Eq. 3) mentioned above, including polynomials of X and Y, with applying the local coordinates system (x, y, z) assuming the apex on each surface to be the origin.

The following table 9 shows lends data of the present embodiment including numerical values thereof, wherein the surface numbers starting from S0, presenting the object surfaces, sequentially, further from S1 to S23. In this table 1, "Rd" is also the radius of curvature for each surface, and "TH" is the distance between the surfaces, i.e., presenting the distance from the apex of the lens surface to the apex of the next lens surface.

TABLE 9

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 5.00 | | |
| S3 | 69.501 | 4.65 | 1.85306 | 17.2 |
| S4 | −477.064 | 18.00 | | |
| S5* | −54.329 | 9.00 | 1.49245 | 42.9 |
| S6* | −53.208 | 0.10 | | |
| S7 | 48.857 | 9.32 | 1.49811 | 60.9 |
| S8 | −29.376 | 2.50 | 1.76014 | 20.0 |
| S9 | 40.402 | 0.10 | | |
| S10 | 40.607 | 9.00 | 1.49811 | 60.9 |
| S11 | −54.359 | 25.90 | | |
| S12 | Infinity | 9.10 | | |
| S13 | 2090.112 | 6.00 | 1.85306 | 17.2 |
| S14 | −66.019 | 65.00 | | |
| S15 | −45.540 | 4.19 | 1.74702 | 33.2 |
| S16 | 108.965 | 9.00 | | |
| S17* | −37.449 | 10.00 | 1.49245 | 42.9 |
| S18* | −75.474 | 2.50 | | |
| S19# | Infinity | 8.00 | 1.49245 | 42.9 |
| S20# | Infinity | 19.35 | | |
| S21# | Infinity | 8.00 | 1.49245 | 42.9 |
| S22# | Infinity | 122.15 | | |
| S23# | Infinity | −605.00 | REFL | |

In this table 9, also the surfaces S5, S6, S17 and S18 are aspheric surfaces, being rotationally symmetric, and also in this table 9, they are attached with "*" beside the surface numbers for easy understanding thereof, wherein coefficients of the aspheric surface of those four (4) surfaces are shown in the table 10 below.

TABLE 10

| Surface | | | | Aspheric Surface Coefficients | | | | |
|---|---|---|---|---|---|---|---|---|
| S5 | K | −13.108806 | C | 1.46508E−11 | F | −2.0555E−19 | J | 8.25281E−27 |
| | A | −2.4809E−06 | D | −3.1244E−14 | G | −2.06E−22 | | |
| | B | 1.95435E−08 | E | −1.5302E−16 | H | −7.5179E−25 | | |
| S6 | K | −8.59084843 | C | 1.51155E−11 | F | −1.6279E−19 | J | 1.22719E−20 |
| | A | 7.67114E−07 | D | −4.743E−15 | G | −1.8394E−21 | | |
| | B | 9.20816E−09 | E | −9.3745E−17 | H | 3.4992E−24 | | |
| S17 | K | 3.170476396 | C | −4.2843E−12 | F | 1.18119E−18 | J | 2.06192E−26 |
| | A | −8.7308E−06 | D | 1.96465E−13 | G | −4.5716E−21 | | |
| | B | −3.8136E−08 | E | 7.89179E−16 | H | −1.5681E−23 | | |
| S18 | K | 9.315246698 | C | 2.51005E−11 | F | −5.9791E−20 | J | 3.13406E−28 |
| | A | −4.2604E−06 | D | 3.09426E−14 | G | −6.6563E−23 | | |
| | B | −1.5518E−08 | E | −8.892E−18 | H | 7.14735E−26 | | |

Also, S19 to S22 in the table 9 mentioned above are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the table 11 below.

does not cause ill influence, such as, enlarging the size of the lens, for example. This eccentricity enables to achieve a fine adjustment on asymmetric chromatic aberration (or chromatism).

TABLE 11

| Surface | | | | Free Curved Surface Coefficients | | | | |
|---|---|---|---|---|---|---|---|---|
| S19 | | | C17 | 3.43096E−07 | C34 | −2.7065E−10 | C51 | 1.990777E−13 |
| | K | 0 | C19 | 2.13857E−06 | C36 | 1.31926E−09 | C53 | −5.2135E−12 |
| | C4 | 0.00503963 | C21 | 9.15856E−08 | C37 | 2.1077E−12 | C55 | −2.1831E−12 |
| | C6 | 0.020700865 | C22 | −1.9441E−09 | C39 | −6.1349E−11 | C56 | −3.3204E−15 |
| | C8 | −0.0007276 | C24 | −9.6181E−09 | C41 | −6.9182E−11 | C58 | 1.52276E−14 |
| | C10 | −0.00062901 | C26 | 2.71279E−09 | C43 | −1.1634E−10 | C60 | 4.722E−14 |
| | C11 | 4.83792E−06 | C28 | 1.5813E−08 | C45 | 1.55247E−11 | C62 | 3.79581E−14 |
| | C13 | 1.58097E−05 | C30 | −4.1204E−10 | C47 | 1.79452E−14 | C64 | 3.11821E−14 |
| | C15 | −1.9636E−05 | C32 | −2.3107E−09 | C49 | −6.0452E−13 | C66 | −1.876E−13 |
| S20 | | | C17 | 6.40078E−08 | C34 | −1.0668E−09 | C51 | −4.5767E−13 |
| | K | 0 | C19 | 2.35312E−06 | C36 | −3.2106E−10 | C53 | −3.1387E−12 |
| | C4 | −0.00417899 | C21 | 9.31605E−07 | C37 | 1.82824E−12 | C55 | 1.09346E−12 |
| | C6 | 0.031326266 | C22 | −5.0811E−10 | C39 | −2.9101E−11 | C56 | −1.6513E−15 |
| | C8 | −0.00077771 | C24 | −3.1548E−08 | C41 | 1.04208E−10 | C58 | 8.47256E−15 |
| | C10 | −0.00097819 | C26 | −8.825E−08 | C43 | 7.01421E−11 | C60 | −1.694E−15 |
| | C11 | 2.05947E−06 | C28 | 3.84368E−08 | C45 | −1.0493E−10 | C62 | −1.7011E−13 |
| | C13 | 2.31241E−05 | C30 | −9.4717E−11 | C47 | 2.95795E−14 | C64 | 6.71828E−14 |
| | C15 | −3.0456E−05 | C32 | −8.4146E−10 | C49 | −7.9902E−13 | C66 | 1.92712E−14 |
| S21 | | | C17 | −1.4263E−07 | C34 | −1.7091E−10 | C51 | −4.2269E−14 |
| | K | 0 | C19 | −3.1384E−08 | C36 | −2.9029E−10 | C53 | 2.21959E−14 |
| | C4 | 0.016712489 | C21 | 3.78605E−07 | C37 | 2.14998E−13 | C55 | −9.5144E−15 |
| | C6 | 0.024854646 | C22 | 7.83561E−10 | C39 | 1.12281E−12 | C56 | −1.3876E−16 |
| | C8 | 0.000280556 | C24 | −1.1076E−09 | C41 | 3.49849E−12 | C58 | −2.0224E−16 |
| | C10 | −5.99E−05 | C26 | −5.1644E−09 | C43 | 2.81764E−12 | C60 | 4.00029E−17 |
| | C11 | −4.5381E−06 | C28 | −1.9091E−09 | C45 | −1.5444E−12 | C62 | −4.1764E−15 |
| | C13 | −7.3701E−06 | C30 | 2.60008E−11 | C47 | −3.3945E−15 | C64 | 1.05212E−15 |
| | C15 | −1.0002E−05 | C32 | 2.73923E−11 | C49 | 2.75972E−14 | C66 | −3.6542E−15 |
| S22 | | | C17 | −1.7327E−07 | C34 | −3.122E−10 | C51 | −3.8555E−14 |
| | K | 0 | C19 | −1.5061E−07 | C36 | −6.1374E−10 | C53 | 2.368E−13 |
| | C4 | 0.016645995 | C21 | 5.38912E−07 | C37 | 9.78887E−14 | C55 | 1.87115E−13 |
| | C6 | 0.021101685 | C22 | 8.11263E−10 | C39 | 1.08112E−12 | C56 | −9.9798E−17 |
| | C8 | 0.00032094 | C24 | −1.1477E−10 | C41 | 3.69407E−12 | C58 | −2.3837E−16 |
| | C10 | −5.1172E−05 | C26 | −4.8707E−09 | C43 | −5.8299E−13 | C60 | −2.2734E−16 |
| | C11 | −4.3183E−06 | C28 | −1.1809E−09 | C45 | −3.7079E−12 | C62 | −3.0547E−15 |
| | C13 | −8.5909E−06 | C30 | 3.39643E−11 | C47 | −2.9359E−15 | C64 | 5.55175E−15 |
| | C15 | −1.0155E−05 | C32 | 1.47622E−10 | C49 | −5.9302E−15 | C66 | −1.0145E−15 |
| S23 | | | C17 | −2.203E−09 | C34 | 8.2099E−14 | C51 | −1.2799E−17 |
| | K | 0 | C19 | 2.39237E−09 | C36 | −4.3614E−14 | C53 | 4.0335E−18 |
| | C4 | 0.002149003 | C21 | 1.39506E−09 | C37 | −1.7915E−16 | C55 | −3.2746E−18 |
| | C6 | 0.000317113 | C22 | 4.22192E−12 | C39 | 1.80308E−15 | C56 | 3.626098E−21 |
| | C8 | 2.85992E−05 | C24 | −3.3322E−11 | C41 | −2.7999E−15 | C58 | −3.5037E−20 |
| | C10 | 9.52914E−06 | C26 | 1.45814E−11 | C43 | 7.24461E−16 | C60 | 6.79833E−20 |
| | C11 | −8.2644E−08 | C28 | 1.00262E−11 | C45 | −1.0528E−15 | C62 | −3.7507E−20 |
| | C13 | 2.89938E−07 | C30 | 1.34005E−13 | C47 | −4.0973E−18 | C64 | 5.06597E−21 |
| | C15 | 1.20082E−07 | C32 | −3.6767E−13 | C49 | 1.4053E−17 | C66 | 5.93238E−21 |

Further, in the following table 12 are shown the inclination of each surface and magnitude of eccentricity according to the third embodiment. In this table 12, the definitions for showing the values of "ADE" and "YDE" are as was mentioned above.

TABLE 12

| Surface | ADE (°) | YDE (mm) |
|---|---|---|
| S0 | −2.000 | 0.0 |
| S15 | 0.0 | 0.304 |
| S17 | 0.0 | −0.304 |
| S23 | 35.000 | 0.0 |

From this table 12, it can be seen that this does not fulfill the condition mentioned above. However, with this third embodiment, it has the structures, being small in the depth thereof, i.e., having priority of the depth.

Also, as is shown in the table 12, similar to the embodiment 2 mentioned above, one (1) piece of lens, which is made up with the surfaces S15 and S16, is offset by −0.304 mm from the optical axis. This amount of offsetting is very small, and it Further, since the value of the difference $|L1-L2|$ of the optical pat, which is shown by the equation (Eq. 1) mentioned above, is 0.62 times large as the height of picture on the screen, and "$\theta s$" is 45 degrees, then this satisfies the condition mentioned above.

Also, from the tables 9 and 11 mentioned above, according to this third embodiment, it is apparent that the curvature "c" and the conic coefficients "k" are "0". Thus, the trapezoidal distortion, being generated due to the oblique incidence, is extremely large in the direction of the oblique incidence, but the amount thereof is small in the direction perpendicular to this. Accordingly, between the direction of the oblique incidence and the direction perpendicular to this, there must be provided functions greatly different from each other, and it is possible to compensate or correct the asymmetric aberration, preferably, without using the curvature "c" nor the conic coefficient "k", being rotationally symmetric and functioning in all directions.

Figure 14:
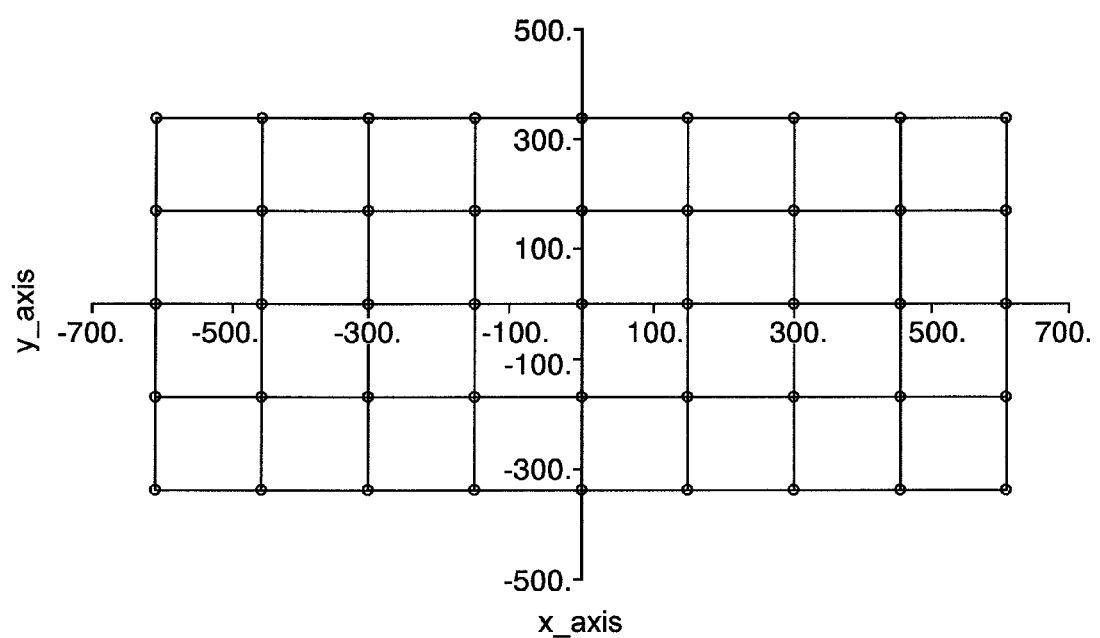
FIG. 14 is a view for showing the distortion power of the optic unit, according to an embodiment 3.

As an effective region of the second embodiment with such the numerical values mentioned above, the region on the object surface (ratio=16:9) is projected, enlargedly, upon the image surface (50"+over-scan: 1210.7×681.0 mm), and the graphic distortion of that is shown in FIG. 14. The vertical direction in this FIG. 14 corresponds to the vertical direction shown in FIG. 2, and the Y-axis. The horizontal direction in this FIG. 14 corresponds to the direction perpendicular to the Y axis on the screen, and a central portion of the oblong in the figure corresponds to the center of the screen. Further, this shows the condition of curvature of each of straight lines, in particular, when displaying the screen while dividing it into four (4) in the vertical direction and eight (8) in the horizontal direction, and thereby showing the state or condition of graphic distortion.

Figure 15:
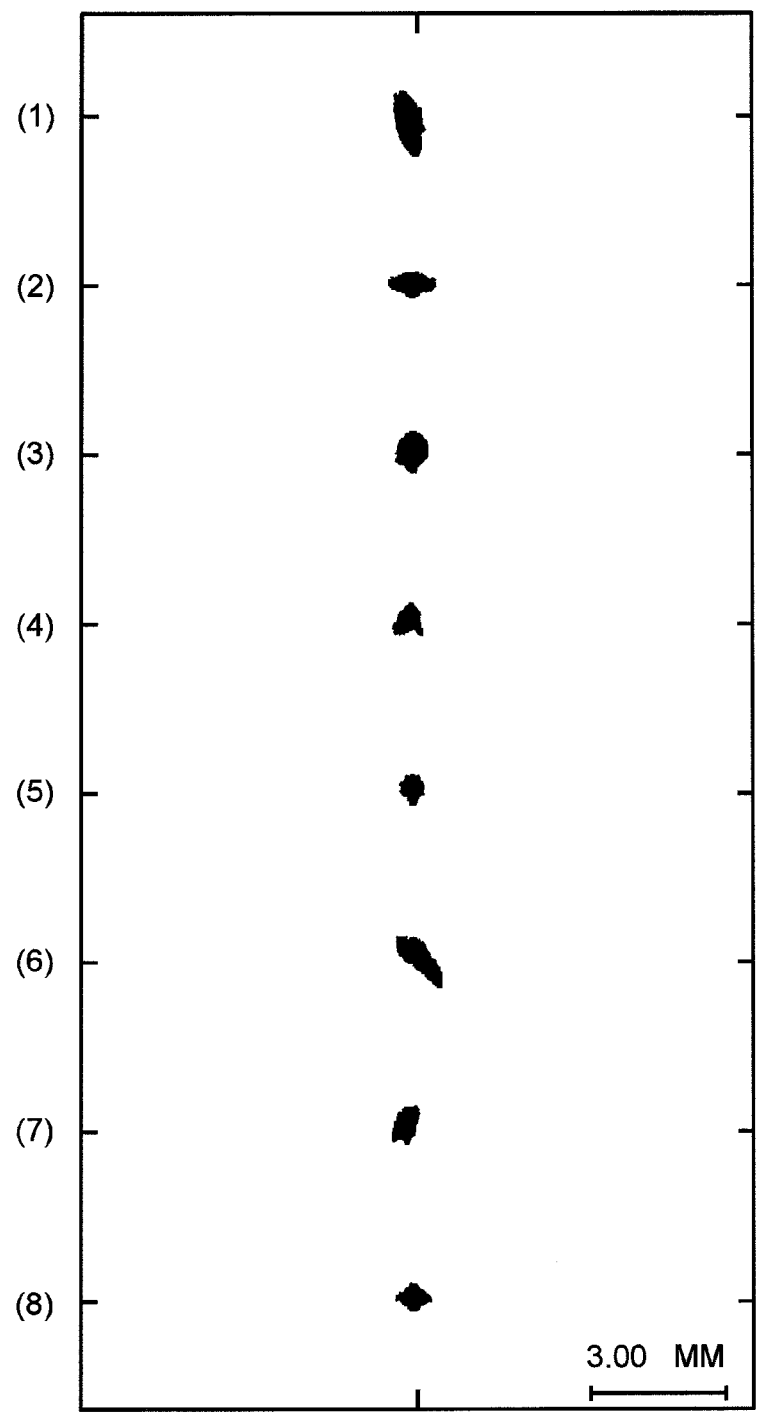
FIG. 15 is a view for showing the spot power of the optic unit, according to the embodiment 3.

Further, FIG. 15 shows spots diagrams according to the present embodiment of numerical values. In this FIG. 15 are shown the spot diagram of the light flux emitting from eight (8) points on the display screen of the image display element 61; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). The unit thereof is "mm". The horizontal direction of each spot diagram corresponds to the X direction on the screen, while the vertical direction the Y direction on the screen. Thus, it is apparent that both of those maintain preferable performances.

Also, in this example, assuming that the size is "Lo" of the projection image obtained through the mentioned above, in the diagonal direction thereof and the distance is "Lp" from the center of the free curved surface mirror 4 up to the projection image, since Lo=1,524 mm, Lp=700×cos 45°□495 mm, then the ratio between them comes to be greater than two (L0/Lp>2), therefore it can be seen that an object surface can be projected, enlargedly, onto the screen, being sufficiently large, even with a relatively near distance; i.e., being superior in the ratio of enlarged projection.

Embodiment 4

Explanation will be made of a fourth embodiment, according to the present invention, by referring to FIGS. 16 and 17 and tables 13 to 16.

Herein. also the light emitting from the image display element 1 is reflected upon the reflection surface 4 of the reflection optic system, which has the free curved surface configuration, thereby to be incident upon the screen 5, after passing through in the order, i.e., the front lens group 2 of the lens optic system, which is built up with the transmission-type lenses having the rotationally symmetric surface configuration and the rear lens group of the lens optic system, which is built up with the transmission-type lenses having the free curved surface configuration.

Thus, herein, also the front lens group 2 of the lens optic system is built up with the plural number of lenses, all of which have a refracting interface of rotationally symmetric configuration, and four (4) of the refracting interfaces of those lenses have aspheric surfaces, each being rotationally symmetric, and others have the spherical surfaces. The aspheric surface being rotationally symmetric, which is used therein, can be expressed by the equation (Eq. 2) mentioned above, with using a local cylindrical coordinates system for each surface.

The free curved surfaces building up the rear lens group 3 of the lens optic system mentioned above can be expressed by the equation (Eq. 3) mentioned above, including polynomials of X and Y, with applying the local coordinates system (x, y, z) assuming the apex on each surface to be the origin.

The following table 13 shows lends data of the fourth embodiment including numerical values thereof, wherein the surface numbers starting from S0, presenting the object surfaces, sequentially, further from S1 to S23. In this table 1, "Rd" is also the radius of curvature for each surface, and "TH" is the distance between the surfaces, i.e., presenting the distance from the apex of the lens surface to the apex of the next lens surface.

TABLE 13

| Surface | Rd | TH | nd | vd |
| --- | --- | --- | --- | --- |
| S0 | Infinity | 10.00 | | |
| S1 | Infinity | 31.34 | 1.51827 | 48.0 |
| S2 | Infinity | 4.97 | | |
| S3 | 49.017 | 4.65 | 1.85306 | 17.2 |
| S4 | 201.672 | 18.00 | | |
| S5* | −60.233 | 9.00 | 1.49245 | 42.9 |
| S6* | −55.360 | 0.10 | | |
| S7 | 56.669 | 9.32 | 1.49811 | 60.9 |
| S8 | −27.651 | 2.50 | 1.76014 | 20.0 |
| S9 | 46.949 | 0.10 | | |
| S10 | 47.407 | 9.00 | 1.49811 | 60.9 |
| S11 | −46.359 | 25.90 | | |
| S12 | Infinity | 9.10 | | |
| S13 | −9457.081 | 6.00 | 1.85306 | 17.2 |
| S14 | −64.870 | 65.00 | | |
| S15 | −42.429 | 4.19 | 1.74702 | 33.2 |
| S16 | 137.716 | 9.00 | | |
| S17* | −34.874 | 10.00 | 1.49245 | 42.9 |
| S18* | −63.364 | 2.50 | | |
| S19# | Infinity | 8.00 | 1.49245 | 42.9 |
| S20# | Infinity | 19.55 | | |
| S21# | Infinity | 8.00 | 1.49245 | 42.9 |
| S22# | Infinity | 121.95 | | |
| S23# | Infinity | −742.00 | REFL | |

In this table 13, "TH" is the distance between the surfaces, i.e., presenting the distance from the apex of the lens surface to the apex of the next lens surface. The distance between the surfaces is presented by a positive value in case when the next lens surface is at the left-hand side (see FIG. 3), while by a negative value in case when it is at the right-hand side, with respect to that lens surface.

In this table 13, S5, S6, S17 and S18 are aspheric surfaces, being rotationally symmetric, and also in this table 13, they are attached with "*" beside the surface numbers for easy understanding thereof, wherein coefficients of the aspheric surface of those four (4) surfaces are shown in the table 14 below.

TABLE 14

| Surface | | Aspheric Surface Coefficients | | | | | | |
| --- | --- | --- | --- | --- | --- | --- | --- | --- |
| S5 | K | −7.49933947 | C | 8.20794E−12 | F | 1.67212E−19 | J | 2.75191E−26 |
| | A | −4.2871E−06 | D | −3.3905E−14 | G | 1.22978E−22 | | |
| | B | 1.47929E−08 | E | 5.30418E−18 | H | −9.2584E−24 | | |
| S6 | K | −5.10683146 | C | 2.31215E−12 | F | 1.4876E−19 | J | 1.4023E−26 |
| | A | −4.215E−08 | D | −8.8141E−15 | G | −2.1285E−21 | | |
| | B | 9.97857E−09 | E | 2.96852E−17 | H | 3.39217E−25 | | |

TABLE 14-continued

| Surface | | | | Aspheric Surface Coefficients | | | | |
|---|---|---|---|---|---|---|---|---|
| S17 | K | 2.729972673 | C | −6.3329E−11 | F | −5.5239E−19 | J | 2.95633E−25 |
| | A | −6.7402E−06 | D | 3.24143E−13 | G | −2.1415E−20 | | |
| | B | −1.1095E−08 | E | 1.38117E−15 | H | −4.6503E−23 | | |
| S18 | K | 5.628556104 | C | 2.5008E−11 | F | −6.694E−20 | J | 4.08388E−28 |
| | A | −1.8686E−06 | D | 1.72887E−14 | G | −5.6024E−23 | | |
| | B | −1.1602E−08 | E | −2.9081E−17 | H | 5.15556E−26 | | |

Also, S19 to S22 in the table 13 mentioned above are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the table 15 below.

Further, in the following table 16 are shown the inclination of each surface and magnitude of eccentricity according to the second embodiment. In this table 16, the definitions for showing the values of "ADE" and "YDE" are as was mentioned above. The inclination of each surface according to the present embodiment is almost same to that of the previous embodiment 1.

TABLE 15

| Surface | | | | Free Curved Surface Coefficients | | | | |
|---|---|---|---|---|---|---|---|---|
| S19 | | | C17 | 3.06092E−07 | C34 | −1.504E−09 | C51 | 1.89916E−12 |
| | K | 0 | C19 | 2.13689E−06 | C36 | 9.24213E−10 | C53 | −2.6408E−12 |
| | C4 | −0.00523704 | C21 | 3.17855E−07 | C37 | 2.73895E−12 | C55 | −2.2305E−12 |
| | C6 | 0.022327058 | C22 | −2.18E−09 | C39 | −5.7332E−11 | C56 | −2.3991E−15 |
| | C8 | −0.00076156 | C24 | −1.35E−08 | C41 | −6.5197E−11 | C58 | 2.74339E−14 |
| | C10 | −0.00059005 | C26 | −4.4124E−09 | C43 | −1.4335E−10 | C60 | 9.09554E−14 |
| | C11 | 4.88728E−06 | C28 | 2.72086E−08 | C45 | −2.1121E−11 | C62 | 2.42098E−14 |
| | C13 | 1.92499E−05 | C30 | −4.0242E−10 | C47 | 4.94771E−14 | C64 | 1.85581E−13 |
| | C15 | −1.9167E−05 | C32 | −2.6688E−09 | C49 | 5.78829E−13 | C66 | −1.2907E−13 |
| S20 | | | C17 | 4.41515E−08 | C34 | −2.1067E−09 | C51 | 1.36481E−13 |
| | K | 0 | C19 | 2.59357E−06 | C36 | −1.3645E−09 | C53 | −1.7814E−12 |
| | C4 | −0.00380713 | C21 | 1.34672E−06 | C37 | 2.5542E−12 | C55 | 1.48598E−12 |
| | C6 | 0.034310744 | C22 | −6.3335E−10 | C39 | −3.0724E−11 | C56 | −1.1411E−15 |
| | C8 | −0.00082075 | C24 | −3.2842E−08 | C41 | 9.742992E−11 | C58 | 1.71485E−14 |
| | C10 | −0.00096306 | C26 | −9.4354E−08 | C43 | 5.80355E−11 | C60 | 1.60064E−14 |
| | C11 | 1.46478E−06 | C28 | 5.63114E−08 | C45 | −1.3903E−10 | C62 | −1.6566E−13 |
| | C13 | 2.57064E−05 | C30 | −1.5828E−10 | C47 | 7.97383E−14 | C64 | 1.4173E−13 |
| | C15 | −3.3719E−05 | C32 | −9.3186E−10 | C49 | −2.2316E−13 | C66 | 5.3295E−14 |
| S21 | | | C17 | −1.4847E−07 | C34 | −1.578E−10 | C51 | −3.1391E−14 |
| | K | 0 | C19 | −4.1463E−08 | C36 | −3.154E−10 | C53 | 4.92021E−14 |
| | C4 | 0.01628158 | C21 | 3.75928E−07 | C37 | 1.44753E−13 | C55 | −1.2229E−14 |
| | C6 | 0.024536292 | C22 | 8.73333E−10 | C39 | 1.02001E−12 | C56 | −1.1929E−16 |
| | C8 | 0.000287791 | C24 | −1.3318E−09 | C41 | 4.04083E−12 | C58 | −1.9881E−16 |
| | C10 | −5.6467E−05 | C26 | −5.0191E−09 | C43 | 2.15125E−12 | C60 | −1.1661E−16 |
| | C11 | −4.4889E−06 | C28 | −1.338E−09 | C45 | 1.05501E−13 | C62 | −3.9789E−15 |
| | C13 | −7.4216E−06 | C30 | 2.11331E−11 | C47 | −1.2171E−15 | C64 | 1.92077E−15 |
| | C15 | −9.5063E−06 | C32 | 3.73498E−11 | C49 | 1.57629E−14 | C66 | −5.4374E−15 |
| S22 | | | C17 | −1.7539E−07 | C34 | −2.5651E−10 | C51 | −3.1411E−14 |
| | K | 0 | C19 | −1.5271E−07 | C36 | −6.0608E−10 | C53 | 2.14522E−13 |
| | C4 | 0.016419443 | C21 | 5.09788E−07 | C37 | 1.26957E−13 | C55 | 1.76045E−13 |
| | C6 | 0.021115451 | C22 | 7.02901E−10 | C39 | 1.00917E−12 | C56 | −9.5762E−17 |
| | C8 | 0.000323178 | C24 | −1.3689E−10 | C41 | 3.91234E−12 | C58 | −2.6471E−16 |
| | C10 | −4.5525E−05 | C26 | −4.0137E−09 | C43 | −1.1163E−12 | C60 | −2.2728E−16 |
| | C11 | −4.138E−06 | C28 | 1.70813E−10 | C45 | −4.4694E−12 | C62 | −3.086E−15 |
| | C13 | −9.223E−06 | C30 | 2.82551E−11 | C47 | −7.7346E−16 | C64 | 5.99803E−15 |
| | C15 | −9.9105E−06 | C32 | 1.42902E−10 | C49 | −1.20512E−14 | C66 | −1.1247E−15 |
| S23 | | | C17 | −2.5231E−09 | C34 | 7.66238E−14 | C51 | −2.3328E−17 |
| | K | 0 | C19 | 2.58369E−09 | C36 | 3.37658E−15 | C53 | 1.85177E−17 |
| | C4 | 0.002289792 | C21 | 1.24861E−09 | C37 | −1.5632E−16 | C55 | −4.0416E−18 |
| | C6 | 0.000330451 | C22 | 4.81491E−12 | C39 | 2.15761E−15 | C56 | 1.15938E−21 |
| | C8 | 3.09058E−05 | C24 | −3.7371E−11 | C41 | −3.7026E−15 | C58 | −3.3248E−20 |
| | C10 | 1.02245E−05 | C26 | 1.56104E−11 | C43 | 1.35291E−15 | C60 | 7.75597E−20 |
| | C11 | −9.5057E−08 | C28 | 7.8498E−12 | C45 | −3.329E−16 | C62 | −8.1537E−20 |
| | C13 | 3.1048E−07 | C30 | 1.56487E−13 | C47 | −4.2776E−18 | C64 | 8.41917E−20 |
| | C15 | 1.27367E−07 | C32 | −4.1734E−13 | C49 | 1.73654E−17 | C66 | −2.3609E−20 |

TABLE 16

| Surface | ADE (°) | YDE (mm) |
| --- | --- | --- |
| S0 | −2.000 | 0.0 |
| S15 | 0.0 | 0.230 |
| S17 | 0.0 | −0.230 |
| S23 | 35.000 | 0.0 |

Thus, from this table 16, it can be seen that this does not fulfill the condition mentioned above. However, with this third embodiment, it has the structures, being small in the depth thereof, i.e., having priority of the depth.

On the other hand, in this fourth embodiment, as is shown in the table 16, the surface S15 is offset by 0.23 mm, while offsetting the surface S17 by 0.23 mm contrarily. In case when offsetting a certain surface, the optical axis is shifted by an amount of offsetting on the surfaces thereafter. Accordingly, the offsetting on this S15 and S17 means that one (1) piece of lens, which is made up with the surfaces S15 and S16, is offset by −0.193 mm from the optical axis. This amount of offsetting is very small, and it does not cause ill influence, such as, enlarging the size of the lens, for example. This eccentricity enables to achieve a fine adjustment on asymmetric chromatic aberration (or chromatism).

Further, since the value of the difference |L1−L2| of the optical pat, which is shown by the equation (Eq. 1) mentioned above, is 0.62 times large as the height of picture on the screen, and "θs" is 45 degrees, then this satisfies the condition of [Eq. 1] mentioned above.

Also, seeing from the tables 13 and 15 mentioned above, according to this fourth embodiment, it is apparent that the curvature "c" and the conic coefficients "k" are "0". Thus, the trapezoidal distortion, being generated due to the oblique incidence, is extremely large in the direction of the oblique incidence, but the amount thereof is small in the direction perpendicular to this. Accordingly, between the direction of the oblique incidence and the direction perpendicular to this, there must be provided functions greatly different from each other, and it is possible to compensate or correct the asymmetric aberration, preferably, without using the curvature "c" nor the conic coefficient "k", being rotationally symmetric and functioning in all directions.

Figure 16:
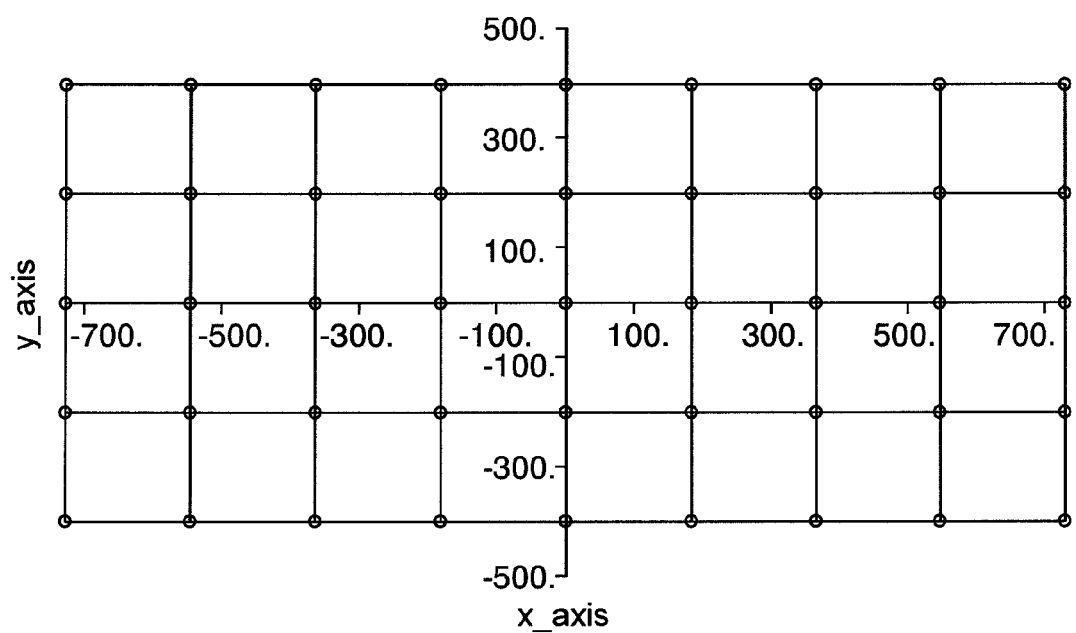
FIG. 16 is a view for showing the distortion power of the optic unit, according to an embodiment 4.

As an effective region of the present embodiment, the region on the object surface (ratio=16:9) is projected, enlargedly, upon the image surface (60"+over-scan: 1452.8× 817.2 mm), and the graphic distortion of that is shown in FIG. 16. The vertical direction in this FIG. 16 corresponds to the vertical direction shown in FIG. 2, and the Y-axis. The horizontal direction in this FIG. 16 corresponds to the direction perpendicular to the Y axis on the screen, and a central portion of the oblong in the figure corresponds to the center of the screen. Further, this shows the condition of curvature of each of straight lines, in particular, when displaying the screen while dividing it into four (4) in the vertical direction and eight (8) in the horizontal direction, and thereby showing the state or condition of graphic distortion.

Figure 17:
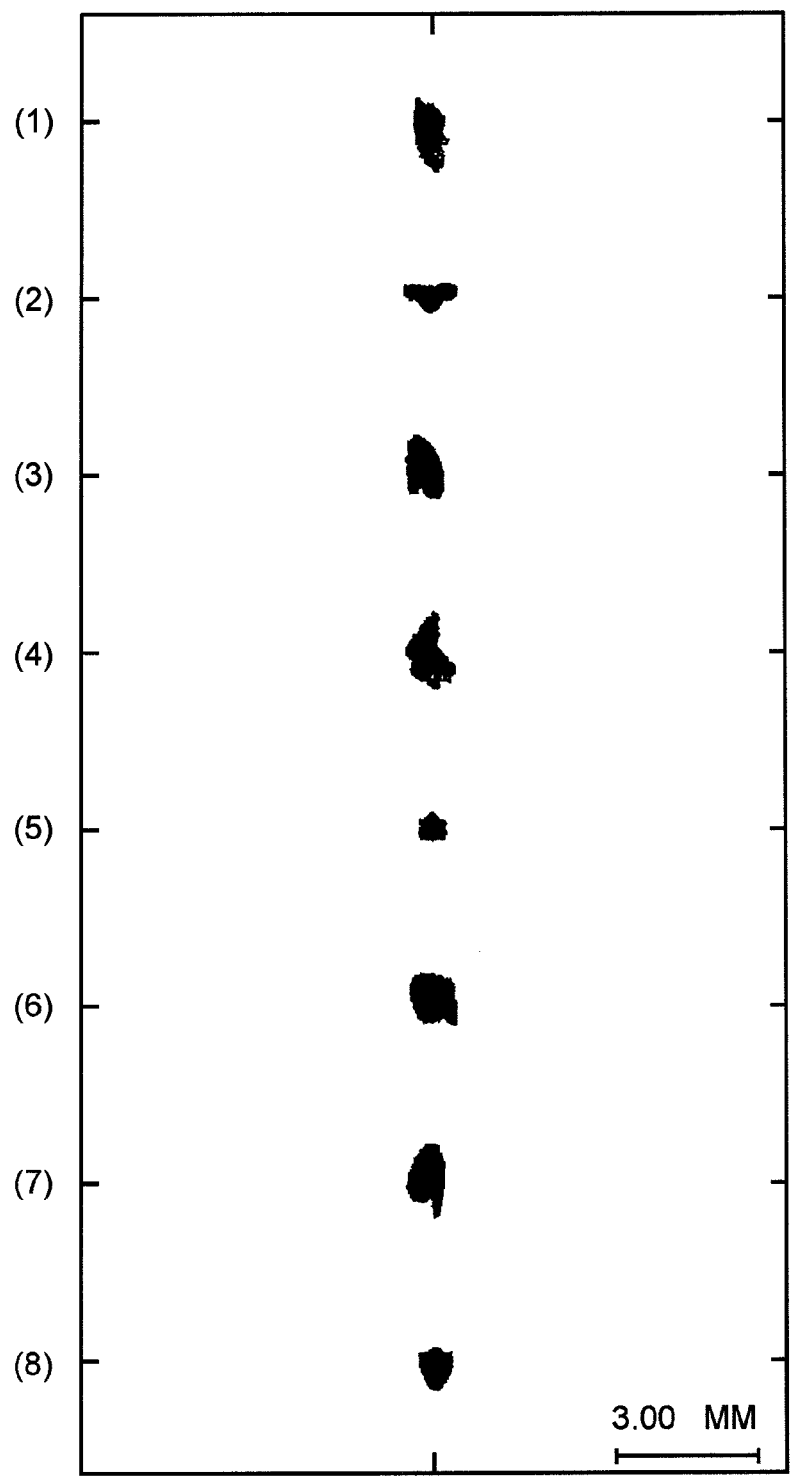
FIG. 17 is a view for showing the spot power of the optic unit, according to the embodiment 4.

Further, FIG. 17 shows spots diagrams according to the present embodiment of numerical values. In this FIG. 17 are shown the spot diagram of the light flux emitting from eight (8) points on the display screen of the image display element 61; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). The unit thereof is "mm". The horizontal direction of each spot diagram corresponds to the X direction on the screen, while the vertical direction the Y direction on the screen. Thus, it is apparent that both of those maintain preferable performances.

Also, in this example, assuming that the size is "Lo" of the projection image obtained through the mentioned above, in the diagonal direction thereof and the distance is "Lp" from the center of the free curved surface mirror 4 up to the projection image, since Lo=1,524 mm, Lp=700×cos 45°≈495 mm, then the ratio between them comes to be greater than two (L0/Lp>2), therefore it can be seen that an object surface can be projected, enlargedly, onto the screen, being sufficiently large, even with a relatively near distance; i.e., being superior in the ratio of enlarged projection.

Figure 18:
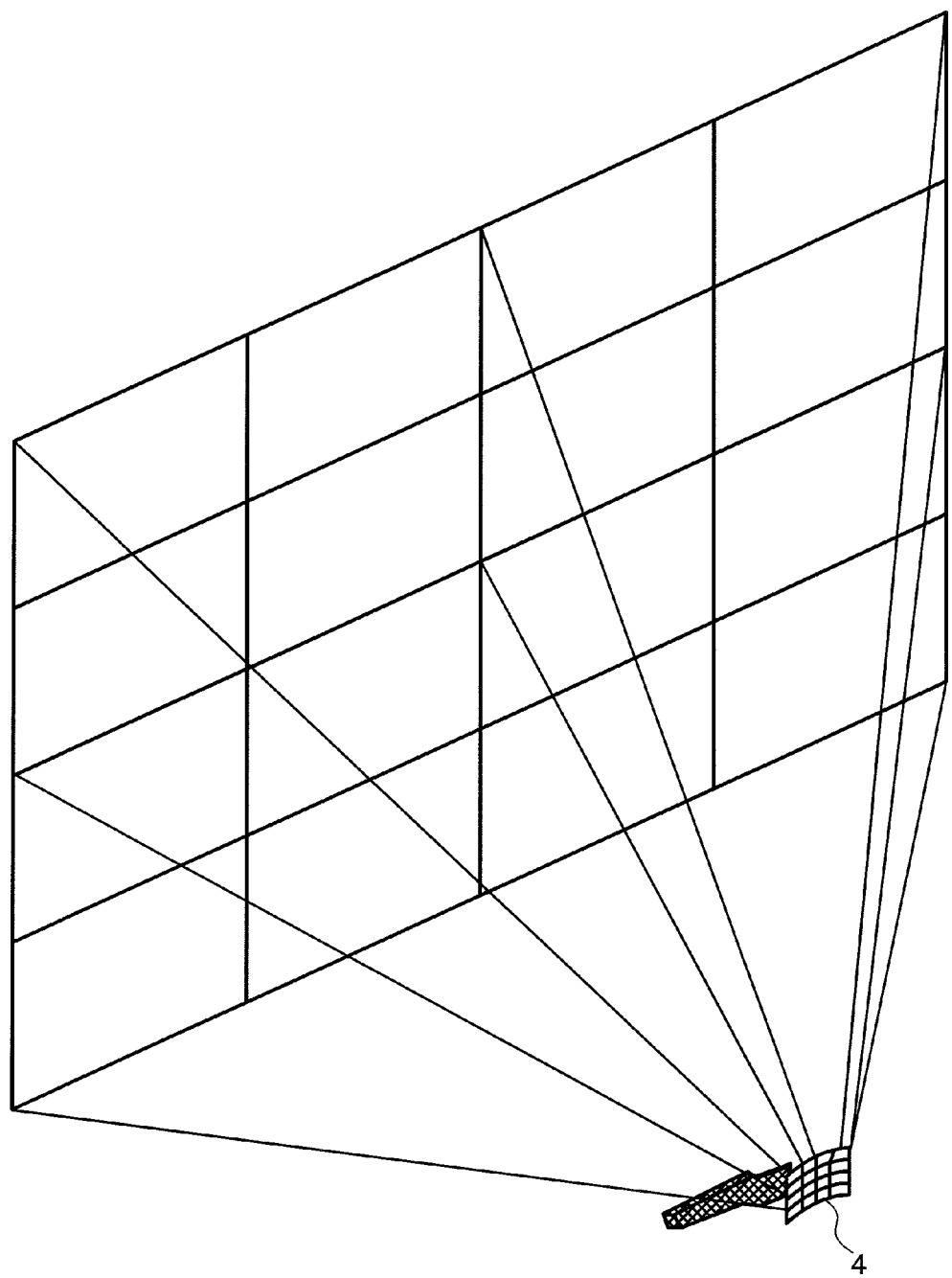
FIG. 18 is a view for showing the condition of projecting an image on a screen, enlargedly, with applying the projection optic unit into the projection-type image display apparatus.
Figure 19:
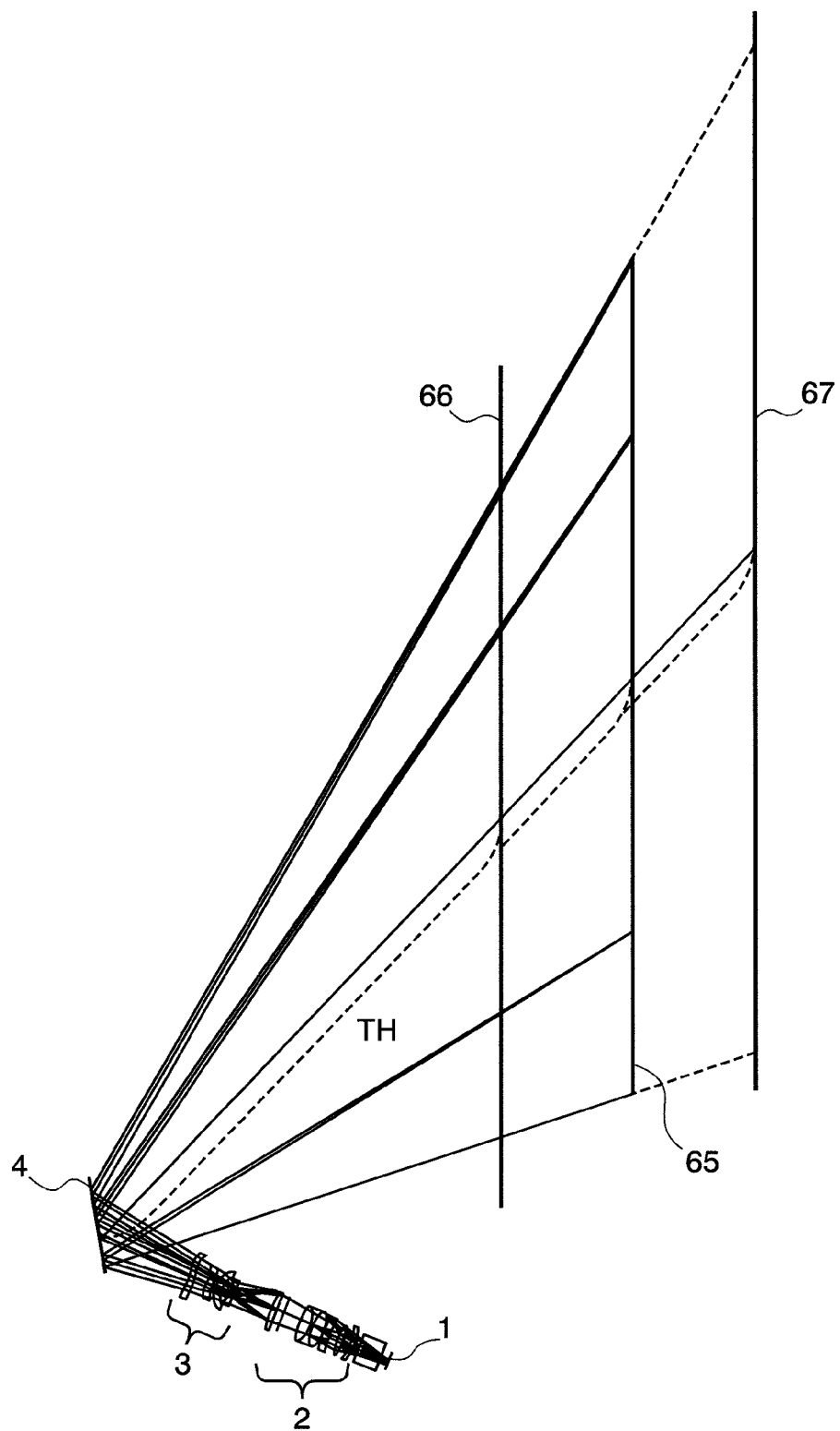
FIG. 19 is a view for showing the condition of changing a projection distance, within the projection-type image display apparatus applying the projection optic unit therein.

Next, FIG. 18 attached herewith shows the condition of projecting an image, enlargedly, upon a wall surface of a room or a sheet-like screen, etc., for example, by applying the projection optic unit, the details of which was mentioned above, into a projection-type image display apparatus, and further FIG. 19 attached herewith shows the problem in case when changing a projection distance, i.e., from the projection optic unit up to the screen. Thus, as is apparent from FIG. 19, in a manner of projecting an image, while inclining the optical axis to the screen with using the free curved surface, the graphic distortion becomes large when changing the projection distance largely from the distance designed, and also the spot size becomes large; i.e., the performance of resolution is deteriorated.

Figure 20A:
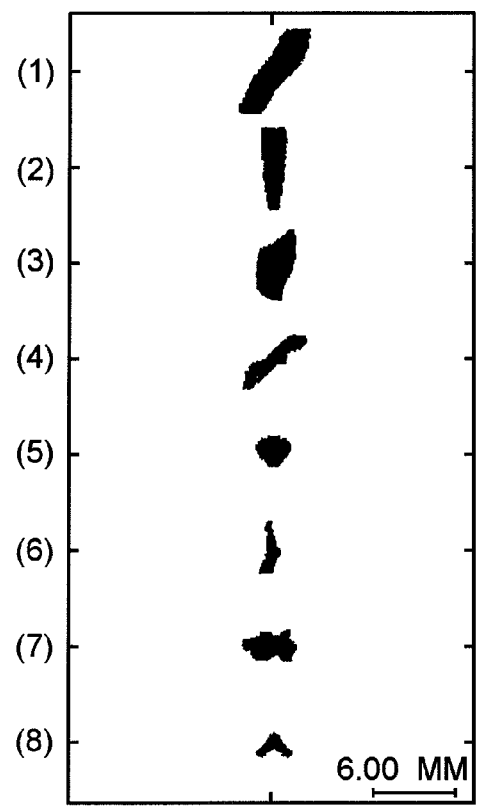
FIGS. 20(a) and 20(b) are views for showing the distortion power and the spot power in case when changing the projection distance, within the projection-type image display apparatus applying the projection optic unit therein.
Figure 20B:
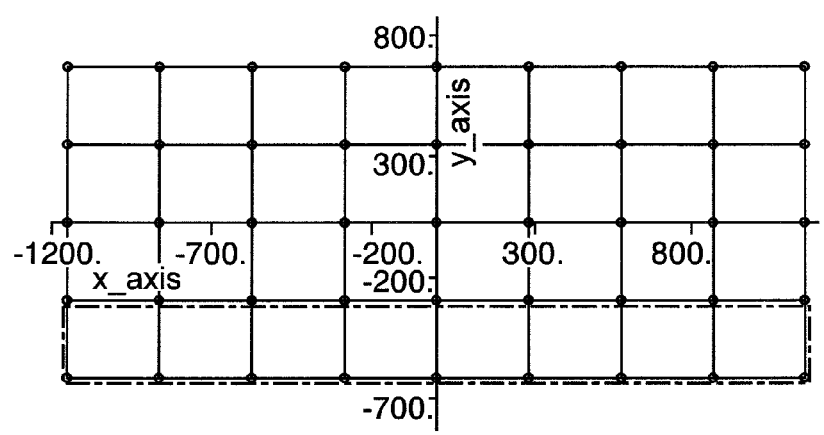
Figure 21A:
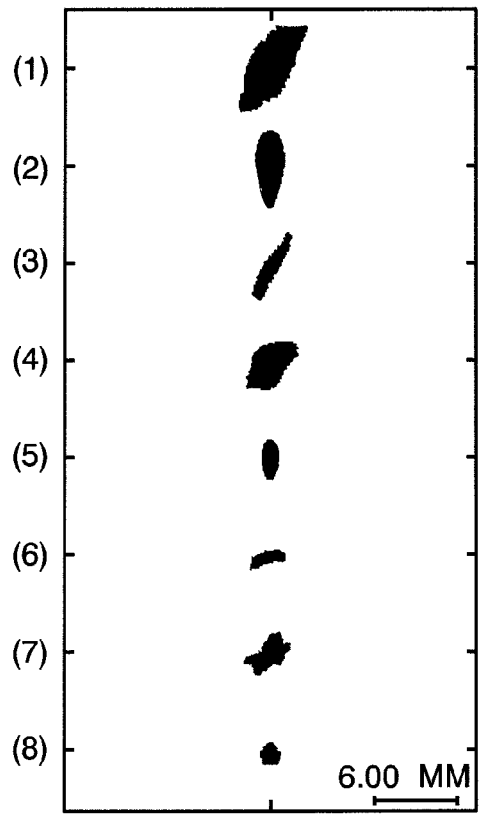
FIGS. 21(a) and 21(b) are views for showing the distortion power and the spot power in case when changing the projection distance, within the projection-type image display apparatus applying the projection optic unit therein.
Figure 21B:
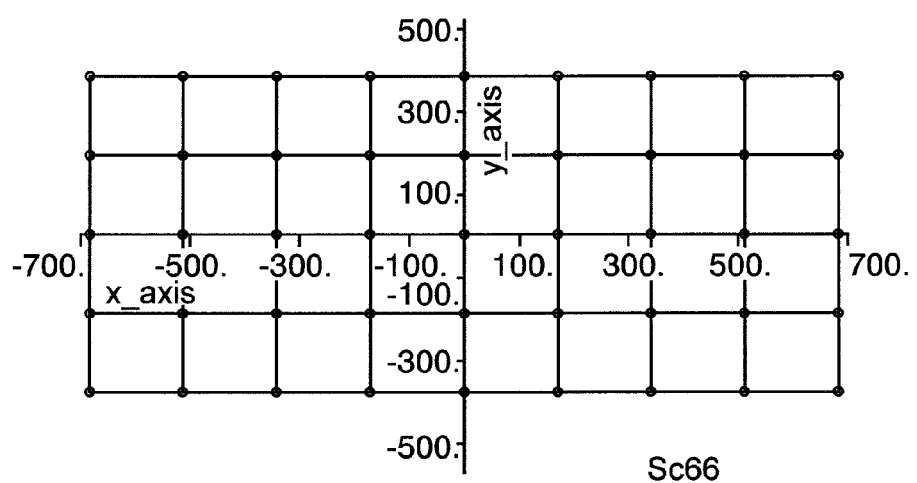

FIGS. 20(a) and 20(b) attached herewith show the spot configuration and the condition of distortions, in particular, when the screen 5 is disposed at a position 66 for reducing the projection screen (for example, corresponding to the 60" screen size), shifting from the designed position 65 (the screen size designed, for example, corresponding to 80" screen), as shown in FIG. 19. On the other hand, FIGS. 21(a) and 21(b) attached herewith show those when it is disposed at a position 67 for enlarging the projection screen (for example, corresponding to the 100" screen size). As apparent from those FIGS. 20(a) through 21(b), the magnitude of distortion increases up to about 2% of or more of the vertical width of the screen, and the stop configuration is enlarged, three (3) times large or more as when it is at the designed position; thus, deteriorating the performance of resolution.

However, with the increase of spots, it is impossible to bring them into preferable spot configuration thereof, in particular, all over the screen, even if shifting the position of the panel into front and back to fit the focus thereon. The reason of this lies in that, because the optic system is not rotationally symmetric, therefore when shifting the panel or the rotationally symmetric lens(es), to bring a portion on the screen into the focus, it rather destroys the focusing of the other portion, largely. Also, even if moving only the lenses 31 and 32 of the rear lens group, i.e., the free curved surface lenses, it is still impossible to compensate or correct that spot configuration. This is because there is necessity of a power of a lens, which is rotationally symmetric, for compensating the distortion accompanying movement of the screen.

Then, upon basis of the embodiment mentioned above, as a result of searching on lenses to have an effect for improvement of the distortion of the spot configuration and/or the resolution performance, with moving the lens corresponding to the movement of the screen position, then it is found that, in particular, it is effective to move the lenses 33 and 34 (see FIGS. 2 and 6 mentioned above), both having a negative power and building up the rear lens group mentioned above, into the direction of the optical axis thereof, respectively and independently, by a predetermined distance. Further, it is also effective to move the mirror 4 having the free curved surface mentioned above. However, because of a large number of difficulties for moving the mirror 4 having the free curved surface, which is relatively large in the size, judging from the structures of the apparatus, it is most effective, in particular, to move the lenses 31-34, building up the rear lens group 3 mentioned above.

Figure 22A:
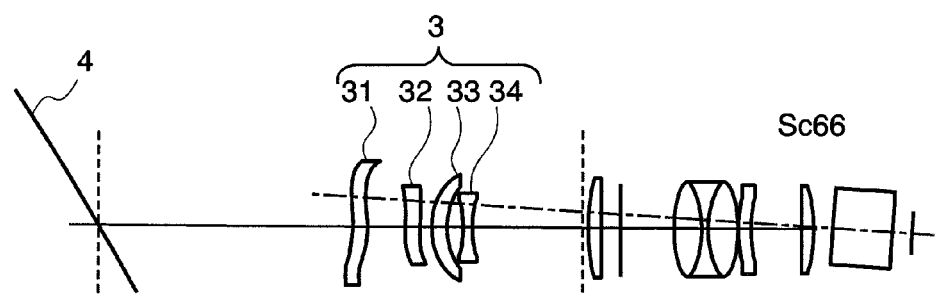
FIGS. 22(a) to 22(c) are views for showing the condition of shifting a rear lens group within the projection optic unit mentioned above.
Figure 22B:
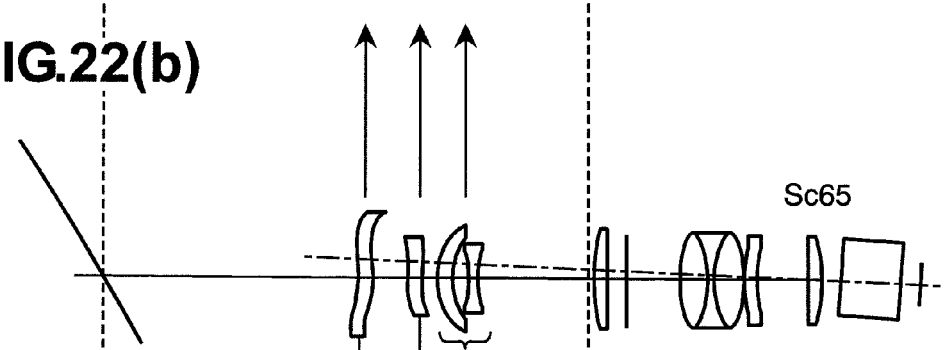
Figure 22C:
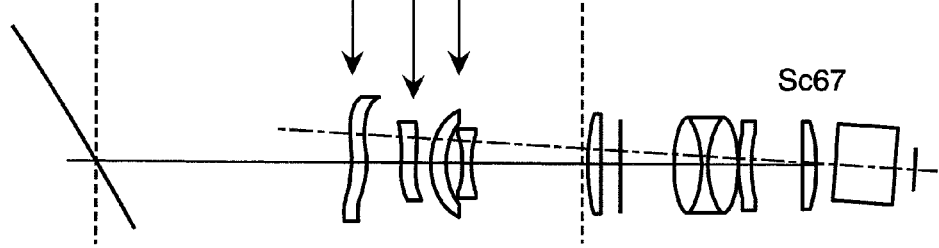

FIGS. 22(a) to 22(c) attached herewith show the conditions when moving the lens building up the rear lens group 3, i.e., the transmission lens 31 having the free curves surface, and the other transmission lens 32 having the free curved surface, and further the rotationally symmetric lenses 33 and 34, each having a negative power, to the predetermined positions thereof. In more details, FIG. 22(a) shows the condition when disposing the screen at the position 66 in the direction for reducing the projection screen (for example, corresponding to the 60" screen size), FIG. 22(b) the condition when disposing the screen at the designed position 65 (for example, corresponding to the 80" screen size), and FIG. 22(c) the condition when disposing the screen at the position 67 in the direction for enlarging the projection screen, respectively, in FIG. 19 mentioned above. Thus, within this embodiment, an adjustment is made for the movement of the screen position, by moving those lens groups, into the direction of the optical axis thereof, i.e., including a lens group unifying the negative power lens building up the rear lens group mentioned above and the lenses in the vicinity thereof, which are rotationally symmetric, as a unit, and also those two (2) pieces of the transmission lens having the free curved surface, each building up one lens group, respectively.

Figure 23A:
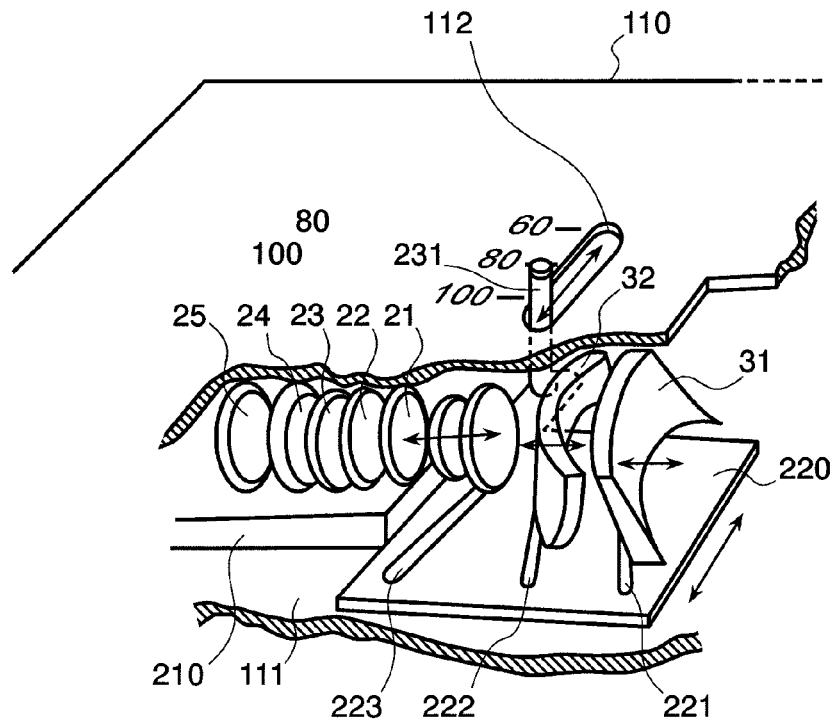
FIGS. 23(a) and 23(b) are perspective views, including a cross-section view in a part thereof, for showing the structures of moving the rear lens group within the projection optic unit, in the projection-type image display apparatus mentioned above.

Further, as was mentioned above, the structures for moving the lenses 31 to 34 for building up the rear lens group 3 mentioned above comprises, for example, as shown in FIG. 23(a) attached herewith, on two (2) sets of mounting bases 210 and 220 are mounted the above-mentioned front lens group 2 (the rotationally symmetric lenses 21-25) and the above-mentioned rear lens group 3 (lenses 31-34), respectively. However, upon one of the mounting bases (for example, the mounting base 210) are fixed the above-mentioned front lens group 2 (the rotationally symmetric lenses 21-25) at the predetermined positions thereof, and that mounting base 210 is installed within the apparatus. And, on the other mounting base (for example, the mounting base 220) are formed grooves 221, 222 and 223, in advance, and also that mounting base 220 is installed within the apparatus to be movable with respect to the mounting base 210 mentioned above (in this example, being movable in the direction perpendicular to that of the optical axis of the lens groups, as is shown by an arrow in the figure).

Figure 23B:
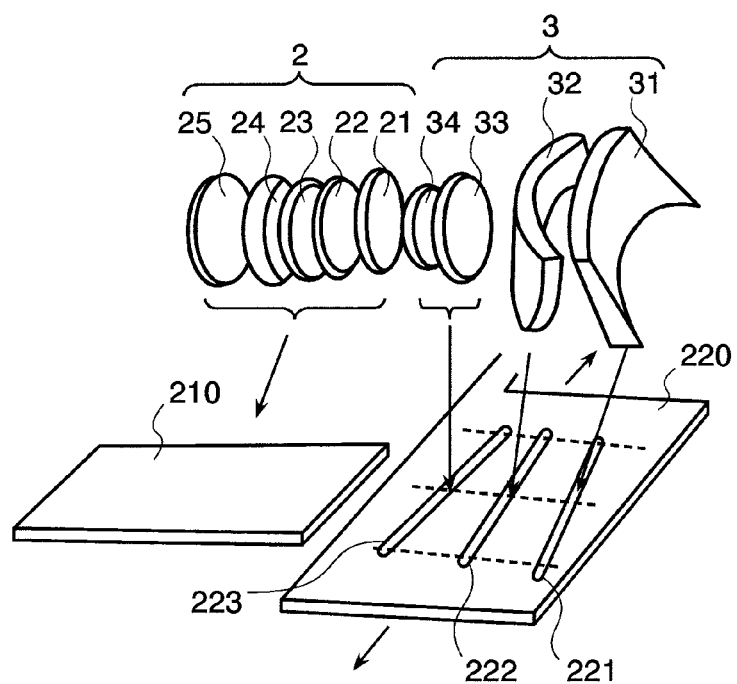

However, with the lenses 31-34 building up the rear lens group 3 mentioned above, as is shown in FIG. 23(b), the lenses 33 and 34 are unified as a body, in other words, they are divided into three (3), i.e., the lens 31, the lens 32 and the lenses 33 and 34, and the respective positions thereof are moved or shifted, corresponding to the sizes of the screen, which can be obtained through projection onto the screen (i.e., 60", 80", and 100"). Thus, those grooves 221, 222 to and 223 are formed at a desired inclining angle for each of the lens groups. With such the structures as was mentioned above, by moving a rod member 231, projecting from the movable mounting base 220 into an outside of the housing, to the positions, at which marks, such as, 60", 80" and 100", or the like, are attached or formed on a surface of the housing 110 in advance, the three (3) groups of lenses, i.e., the lens 31, the lens 32 and the lenses 33 and 34 move, respectively, along with the grooves 221, 222 and 223, and thereby being disposed at the desired positions thereof. Thus, with such the structures, it is possible to change the sizes of the projection image, without deteriorations in distortion of the spot configuration or resolution power or performance, from an outside of the projection-type image display apparatus, by shifting a tip of the rod-like member 321 mentioned above into the direction of an arrow in the figure.

Alternatively, in the place of such the structures as was mentioned above, it is also possible to achieve the effect similar to that mentioned above, with using a cylinder, on an outer periphery of which are formed such the grooves as mentioned above, for example. However, in such the case, in particular, it is not necessary for the two (2) pieces of transmission lenses 31 and 32, each having the free curved surface within the rear lens group 3, to be accompanied with rotation thereof, irrespective of the change of relative positions thereof in the direction of the optical aids. For this reason, it is preferable, for example, the cylindrical member is divided into a top end side and a rear end side, i.e., each being rotatable independently, but the top end side cannot rotate, within the structures thereof. Further, with using a driving means including an electric motor therein, for example, it is also possible to adopt the structures, so that the rear lens group 3 (i.e., the lenses 31-34) can be move, respectively. Thus, with this, it is possible to obtain an effect of achieving an improvement in the distortion of spot configuration and/or the resolution power or performance, corresponding to changes of position of the screen, on which the image is projected (i.e., the distance from the apparatus to the screen).

Figure 24:
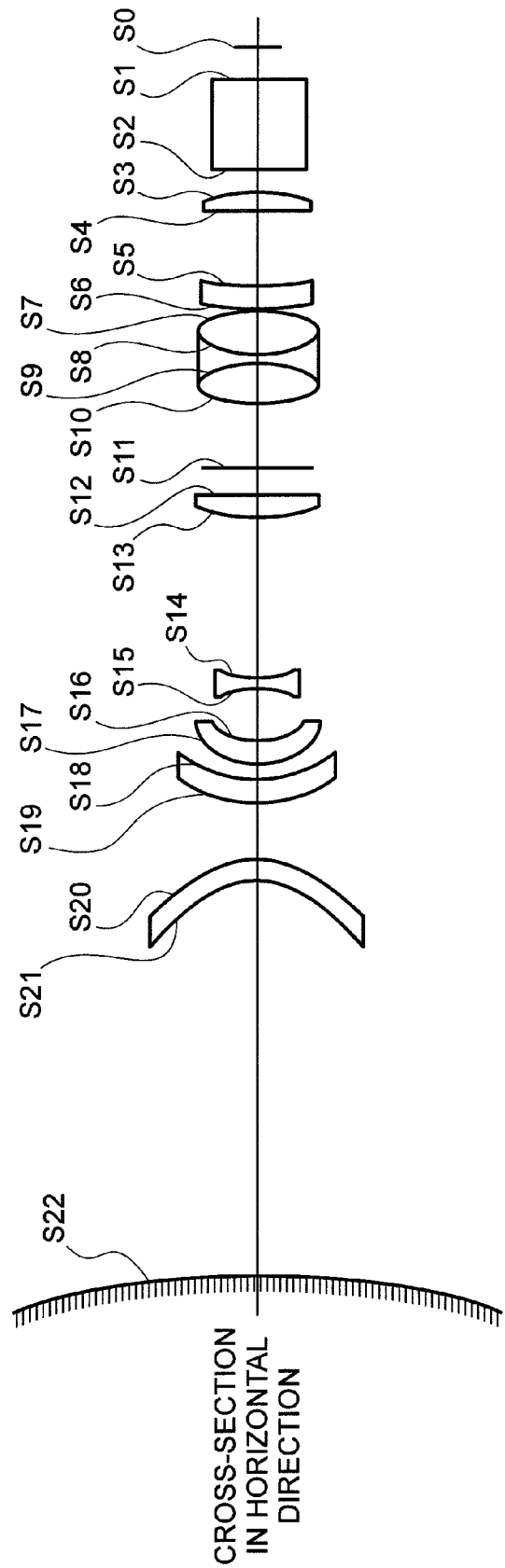
FIG. 24 is a cross-section view in the horizontal direction, for explaining the lens surfaces within the projection optic unit mentioned above.

Following to the above, lens data of the embodiment mentioned above will be shown hereinafter, by referring to the following tables 17-21 and FIGS. 24 to 26.

Herein also, the equation for the free curved surface is same to the [Eq. 2] mentioned above. And, the numerical values in the following tables 17-20 are those for showing an example of projecting the image within a region on the object surface (ratio=16:9) onto the image surface (60"+over-scan: 1841.9× 1036.1 mm), enlargedly. Also, the lens surfaces of the optical elements within the projection optic unit in this case will be shown in FIG. 24. However, differing from those embodiments mentioned above, the lens surfaces indicated by S9 and S10 in FIG. 4 mentioned above, according to the present embodiment, are unified as one body, in this FIG. 21, and therefore they are built up with the surfaces S0 to S22.

In the table 17, "Rd" is the radius of curvature for each surface, and it is presented by a positive value in case when having a center of curvature on the left-hand side of the surface in the figure, while by a negative value in case when having it on the right-hand side, contrary to the above. Also, "TH" is the distance between the surfaces, i.e., presenting the distance from the apex of the lens surface to the apex of the next lens surface. The distance between the surfaces is presented by a positive value in case when the next lens surface is at the left-hand side, while by a negative value in case when it is at the right-hand side, with respect to that lens surface. Further, in this table 17 mentioned above, S5, S6, S16 and S17 (see FIG. 4 mentioned above) are aspheric surfaces, being rotationally symmetric, and also in the table 17, they are attached with "*" beside the surface numbers for easy understanding thereof. Further, coefficients of the aspheric surface of those four (4) surfaces are shown in the table 18 below.

TABLE 17

| Surface | Rd | TH | nd | vd |
| --- | --- | --- | --- | --- |
| S0 | Infinity | 7.600 | | |
| S1 | Infinity | 22.200 | 1.51827 | 48.0 |
| S2 | Infinity | 7.343 | | |
| S3 | 62.278 | 4.500 | 1.85306 | 17.2 |
| S4 | −266.980 | 19.016 | | |
| S5* | −51.942 | 5.000 | 1.49245 | 42.9 |
| S6* | −47.349 | 0.100 | | |
| S7 | 32.165 | 11.700 | 1.48876 | 52.8 |
| S8 | −32.506 | 2.246 | 1.85306 | 17.2 |
| S9 | 33.772 | 10.500 | 1.48876 | 52.8 |
| S10 | −42.116 | 18.784 | | |
| S11 | Infinity | 6.916 | | |
| S12 | 198.090 | 5.500 | 1.85306 | 17.2 |
| S13 | −59.931 | 41.959 | | |
| S14 | −20.939 | 3.200 | 1.74702 | 33.2 |
| S15 | 134.847 | 4.782 | | |
| S16* | −27.918 | 6.000 | 1.49245 | 42.9 |
| S17* | −31.695 | 6.437 | | |
| S18# | Infinity | 6.000 | 1.49245 | 42.9 |
| S19# | Infinity | 11.138 | | |
| S20# | Infinity | 6.000 | 1.49245 | 42.9 |

TABLE 17-continued

| Surface | Rd | TH | nd | vd |
|---|---|---|---|---|
| S21# | Infinity | 91.557 | | |
| S22# | Infinity | −996.000 | REFL | |

TABLE 18

| Surface | | Aspheric Surface Coefficients | | | | | | | |
|---|---|---|---|---|---|---|---|---|---|
| 5 | K | −19.19 | C | 1.6E−10 | F | 1.19E−17 | J | 1.28E−24 | |
| | A | −1.3E−05 | D& | −8.9E−13 | G | 1.59E−19 | | | |
| | B | 7.24E−08 | E | −3.5E−15 | H& | −8.8E−22 | | | |
| 6 | K | −14.7411 | C | 1.79E−10 | F | 2.48E−17 | J | 3.16E−25 | |
| | A | −6.9E−06 | D& | −1.1E−12 | G | −3.2E−20 | | | |
| | B | 6.14E−08 | E | −1.8E−15 | H& | −1.4E−22 | | | |
| 16 | K | −2.80795 | C | −3.6E−10 | F | −6.5E−17 | J | 4.91E−24 | |
| | A | −1.18E−05 | D& | 2.15E−13 | G | −8.8E−19 | | | |
| | B | −2.2E−07 | E | 2.24E−14 | H& | 6.62E−22 | | | |
| 17 | K | −3.04559 | C | −1.3E−11 | F | −6.7E−18 | J | 1.47E−25 | |
| | A | 7.14E−06 | D& | 8.97E−13 | G | −2.7E−20 | | | |
| | B | −1.5E−07 | E | 8.7E−17 | H& | −3.1E−23 | | | |

Also, S18 to S21 in the table 17 mentioned above are the refraction surfaces, each having the free curved surface configuration, which builds up the rear lens group of the lens optic system mentioned above, and S22 is the reflection surface having the free curved surface mirror, wherein they are shown by attaching "#" beside the surface numbers thereof. Values of the coefficients for presenting the configurations of those five (5) free curved surfaces are shown in the table 19 below.

Next, in the table 19 below, the name and the value of each coefficient are shown in a combination of frames alighting left and right, wherein the right-hand side is the value of the coefficient and the left-hand side the name, wherein a set of the numerical values divided by a comma within parenthesis presents the values "m" and "n" shown in the [Eq. 2] mentioned above.

TABLE 19

| Surface | | | Free c Curved Surface Coefficients | | | | | | |
|---|---|---|---|---|---|---|---|---|---|
| 18 | | | C (4, 1) | 1.66E−06 | C (2, 5) | −6.4E−09 | C (4, 5) | 2.8E−12 |
| | K | 0 | C (2, 3) | 2.53E−06 | C (0, 7) | 7.43E−09 | C (2, 7) | 5.2E−11 |
| | C (2, 0) | −0.01616 | C (0, 5) | 1.98E−06 | C (8, 0) | −4.6E−11 | C (0, 9) | −2E−11 |
| | C (0, 2) | −0.1788 | C (6, 0) | 4.65E−08 | C (6, 2) | −2.1E−10 | C (10, 0) | −1.7E−13 |
| | C (2, 1) | −0.00075 | C (4, 2) | −5.3E−09 | C (4, 4) | −9.1E−10 | C (8, 2) | 4.71E−13 |
| | C (0, 3) | −0.00079 | C (2, 4) | 2.61E−08 | C (2, 6) | −3E−10 | C (6, 4) | 2.11E−12 |
| | C (4, 0) | 9.37E−06 | C (0, 6) | −4.1E−08 | C (0, 8) | 1.55E−10 | C (4, 6) | 2.48E−12 |
| | C (2, 2) | 2.32E−05 | C (6, 1) | −5.2E−09 | C (8, 1) | 1.38E−12 | C (2, 8) | 1.11E−12 |
| | C (0, 4) | 3.49E−05 | C (4, 3) | −1.6E−08 | C (6, 3) | 5.41E−11 | C (0, 10) | −3.6E−13 |
| 19 | | | C (4, 1) | 3.72E−07 | C (2, 5) | 1.86E−09 | C (4, 5) | −8.4E−12 |
| | K | 0 | C (2, 3) | 7.05E−07 | C (0, 7) | 6.3E−09 | C (2, 7) | 1.61E−11 |
| | C (2, 0) | −0.1514 | C (0, 5) | 5.2E−07 | C (8, 0) | 2.16E−12 | C (0, 9) | −6.2E−12 |
| | C (0, 2) | −0.01501 | C (6, 0) | 3.39E−12 | C (6, 2) | −2.8E−12 | C (10, 0) | −1.2E−13 |
| | C (2, 1) | −0.00072 | C (4, 2) | −1E−08 | C (4, 4) | −2.8E−10 | C (8, 2) | 5.85E−14 |
| | C (0, 3) | −0.00078 | C (2, 4) | −5.5E−08 | C (2, 6) | 1.8E−10 | C (6, 4) | 7.4E−13 |
| | C (4, 0) | 4.19E−06 | C (0, 6) | −1.1E−07 | C (0, 8) | 2.33E−10 | C (4, 6) | 4.42E−13 |
| | C (2, 2) | 2.77E−05 | C (6, 1) | −9.1E−10 | C (8, 1) | −1.6E−12 | C (2, 8) | 7.55E−15 |
| | C (0, 4) | 3.81E−05 | C (4, 3) | −5.8E−09 | C (6, 3) | 2.17E−11 | C (0, 10) | 2.57E−13 |
| 20 | | | C (4, 1) | −8.8E−07 | C (2, 5) | 2.22E−09 | C (4, 5) | −2.3E−12 |
| | K | 0 | C (2, 3) | −6.1E−07 | C (0, 7) | −1.9E−09 | C (2, 7) | 1.21E−12 |
| | C (2, 0) | 0.027017 | C (0, 5) | −2E−07 | C (8, 0) | 1.23E−12 | C (0, 9) | 1.01E−13 |
| | C (0, 2) | 0.013975 | C (6, 0) | 7.2E−10 | C (6, 2) | 2.59E−11 | C (10, 0) | −1.4E−16 |
| | C (2, 1) | 0.00078 | C (4, 2) | −2E−08 | C (4, 4) | 6.17E−11 | C (8, 2) | −2.1E−14 |
| | C (0, 3) | 0.000502 | C (2, 4) | −8.2E−09 | C (2, 6) | 1.19E−10 | C (6, 4) | −1.7E−14 |
| | C (4, 0) | −6.8E−06 | C (0, 6) | −3.4E−08 | C (0, 8) | 7.66E−12 | C (4, 6) | −1.1E−13 |
| | C (2, 2) | −1.9E−06 | C (6, 1) | 4.75E−10 | C (8, 1) | 4.11E−14 | C (2, 8) | −5.5E−14 |
| | C (0, 4) | −2.1E−05 | C (4, 3) | 1.45E−09 | C (6, 3) | −8.3E−13 | C (0, 10) | 3.29E−14 |
| 21 | | | C (4, 1) | −1.3E−06 | C (2, 5) | 3.4E−09 | C (4, 5) | −2.6E−12 |
| | K | 0 | C (2, 3) | −9.9E−07 | C (0, 7) | −1.7E−09 | C (2, 7) | −9.2E−13 |
| | C (2, 0) | 0.028429 | C (0, 5) | −6.1E−07 | C (8, 0) | 2.33E−12 | C (0, 9) | 1.91E−12 |
| | C (0, 2) | 0.011865 | C (6, 0) | 8.35E−10 | C (6, 2) | 2.38E−11 | C (10, 0) | −5.5E−16 |
| | C (2, 1) | 0.001007 | C (4, 2) | −1.8E−08 | C (4, 4) | 5.95E−11 | C (8, 2) | −2.2E−14 |
| | C (0, 3) | 0.000596 | C (2, 4) | 1.32E−08 | C (2, 6) | 6.51E−11 | C (6, 4) | −2.8E−14 |
| | C (4, 0) | −7.9E−06 | C (0, 6) | −6.9E−09 | C (0, 8) | −5.8E−11 | C (4, 6) | −8.9E−14 |
| | C (2, 2) | −2.8E−06 | C (6, 1) | 9.14E−10 | C (8, 1) | −1.1E−13 | C (2, 8) | −4.5E−14 |
| | C (0, 4) | −2.8E−05 | C (4, 3) | 2.2E−09 | C (6, 3) | −1.5E−12 | C (0, 10) | 1.23E−13 |
| 22 | | | C (4, 1) | −1.55E−08 | C (2, 5) | −3.17E−12 | C (4, 5) | −8.31E−17 |
| | K | 0 | C (2, 3) | 1.79E−09 | C (0, 7) | 1.00E−12 | C (2, 7) | −8.62E−16 |
| | C (2, 0) | 0.003857 | C (0, 5) | 5.04E−09 | C (8, 0) | −6.30E−15 | C (0, 9) | 2.81E−16 |
| | C (0, 2) | 0.001542 | C (6, 0) | 5.14E−11 | C (6, 2) | 5.88E−14 | C (10, 0) | 2.50E−19 |
| | C (2, 1) | 6.83E−05 | C (4, 2) | −3.38E−10 | C (4, 4) | −1.90E−14 | C (8, 2) | −3.80E−18 |
| | C (0, 3) | 3.28E−05 | C (2, 4) | −1.19E−10 | C (2, 6) | −6.92E−14 | C (6, 4) | 7.75E−18 |

TABLE 19-continued

| Surface | | | | Free c Curved Surface Coefficients | | | |
|---|---|---|---|---|---|---|---|
| C (4, 0) | −3.7E−07 | C (0, 6) | 4.08E−11 | C (0, 8) | 2.52E−14 | C (4, 6) | −4.39E−18 |
| C (2, 2) | 7.66E−07 | C (6, 1) | 2.63E−12 | C (8, 1) | −2.66E−16 | C (2, 8) | −1.82E−18 |
| C (0, 4) | 4.96E−07 | C (4, 3) | −4.13E−12 | C (6, 3) | 8.19E−16 | C (0, 10) | 3.67E−19 |

Further, in the following table 20 are shown the inclination of each surface and magnitude of eccentricity according to this embodiment. However, in this table 20, "ADE" indicates the magnitude of inclination upon the surface in parallel with the cross-section of the figure, and it is assumed that the direction of inclination is positive when it rotates into the clockwise direction upon the cross-section surface in the figure, and is shown by the unit of degree. Also, "YDE" indicates the magnitude of eccentricity or offset, and this eccentricity or offset is set up on the cross-section surface of the figure and also in the direction perpendicular to the optical axis, assuming that it is positive when offsetting below.

TABLE 20

| Surface | ADE (°) | YDE (mm) |
|---|---|---|
| S3 | 3.251 | 1.647 |
| S22 | 33.000 | 0.0 |

With the inclination or the eccentricity shown in this table 20, all of the surfaces after that, including the surface number shown therein, are disposed on the inclined optical axis on the surface displayed. However, the inclination of the surface S22 indicates only the inclination of the optical axis on the $22^{nd}$ surface, and the $23^{rd}$ surface thereafter is disposed on the optical axis, which is inclined two (2) times large in the amount of inclination of the $22^{nd}$ surface.

The following table 21 shows changes the distances between the surfaces thereof, in particular, with the lens group, which are moved responding to the movement of the screen position.

TABLE 21

| | TH | | |
|---|---|---|---|
| Surface | Sc65 | Sc67 | Sc66 |
| S13 | 41.959 | 41.935 | 41.991 |
| S17 | 6.437 | 7.841 | 4.000 |
| S19 | 11.138 | 10.169 | 12.785 |
| S21 | 91.557 | 91.145 | 92.314 |
| S22 | −996.000 | −1259.800 | −732.335 |

Where, the values in the columns corresponding to "Sc65", "Sc67" and "Sc66" in this table 9 indicate the distances between the lenses at the screen positions 65, 67 and 66.

Figure 25A:
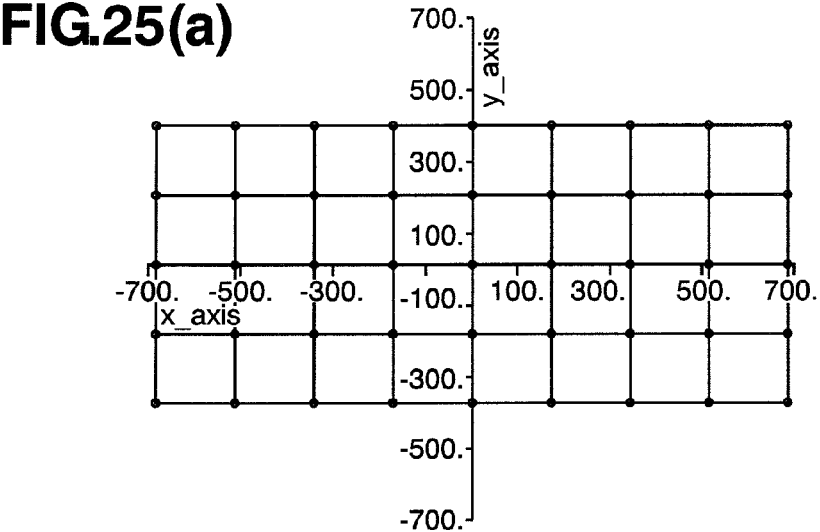
FIGS. 25(a) to 25(c) are views for showing the distortion power in case when shifting a rear lens group within the projection optic unit mentioned above.
Figure 25B:
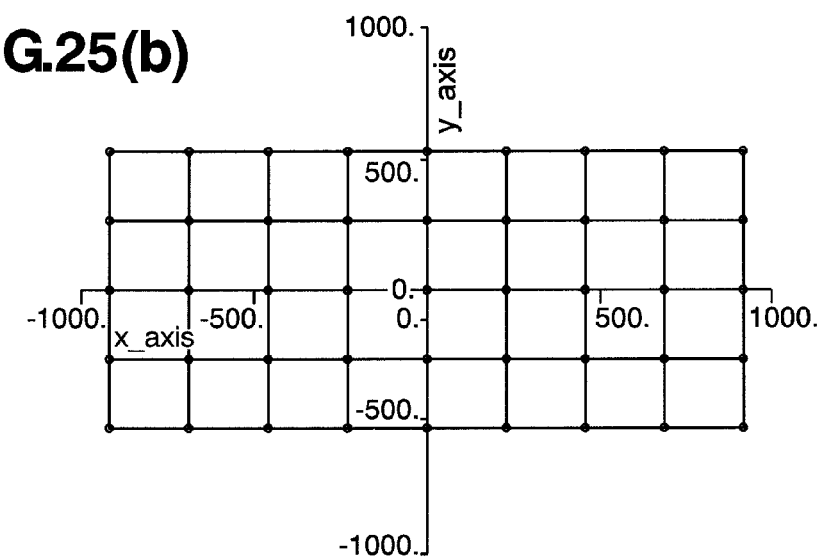
Figure 25C:
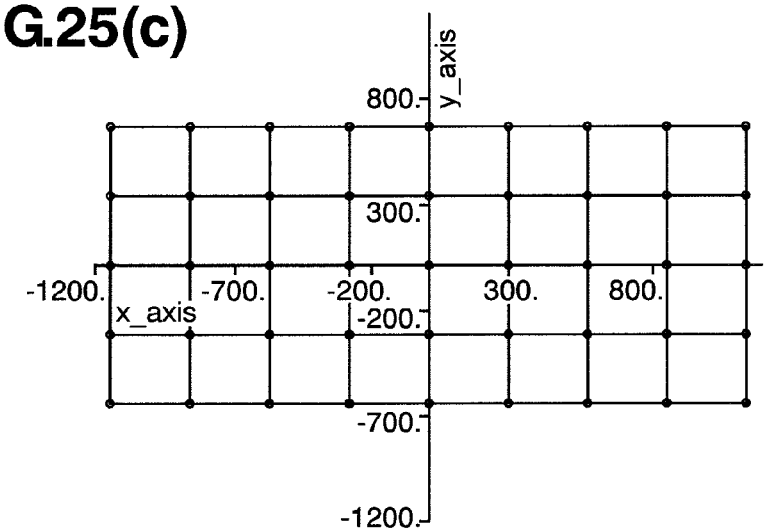

Also, FIGS. 25(a) to 25(c) attached herewith show situations of the distortions in cases where the screen is located at the positions 66, 65 and 67 in FIG. 19 mentioned above, respectively, and FIG. 26 attached herewith shows the conditions of the spot configurations in such the cases.

Thus, FIGS. 25(a) to 25(c) show the graphic distortions in cases when projecting the region (12.16×0.84 mm) on the object surface (ratio=16:9), enlargedely, onto the image surfaces of 60", 80" and 100", respectively. The vertical direction in those FIGS. 25(a) to 25(c) corresponds to the up-down direction, i.e., the Y-axis direction, in FIG. 2 mentioned above. Also, the horizontal direction in those FIGS. 26(a) to 26(c) corresponds to the direction perpendicular to the Y-axis on the screen, wherein the center of the oblong in the figure is the center of the screen. And, those FIGS. 25(a) to 25(c) show the condition of the graphic distortions by showing the condition of curvatures of the straight lines on the screen, which are divided into four (4) in the vertical direction and eight (8) in the horizontal direction.

Figure 26:
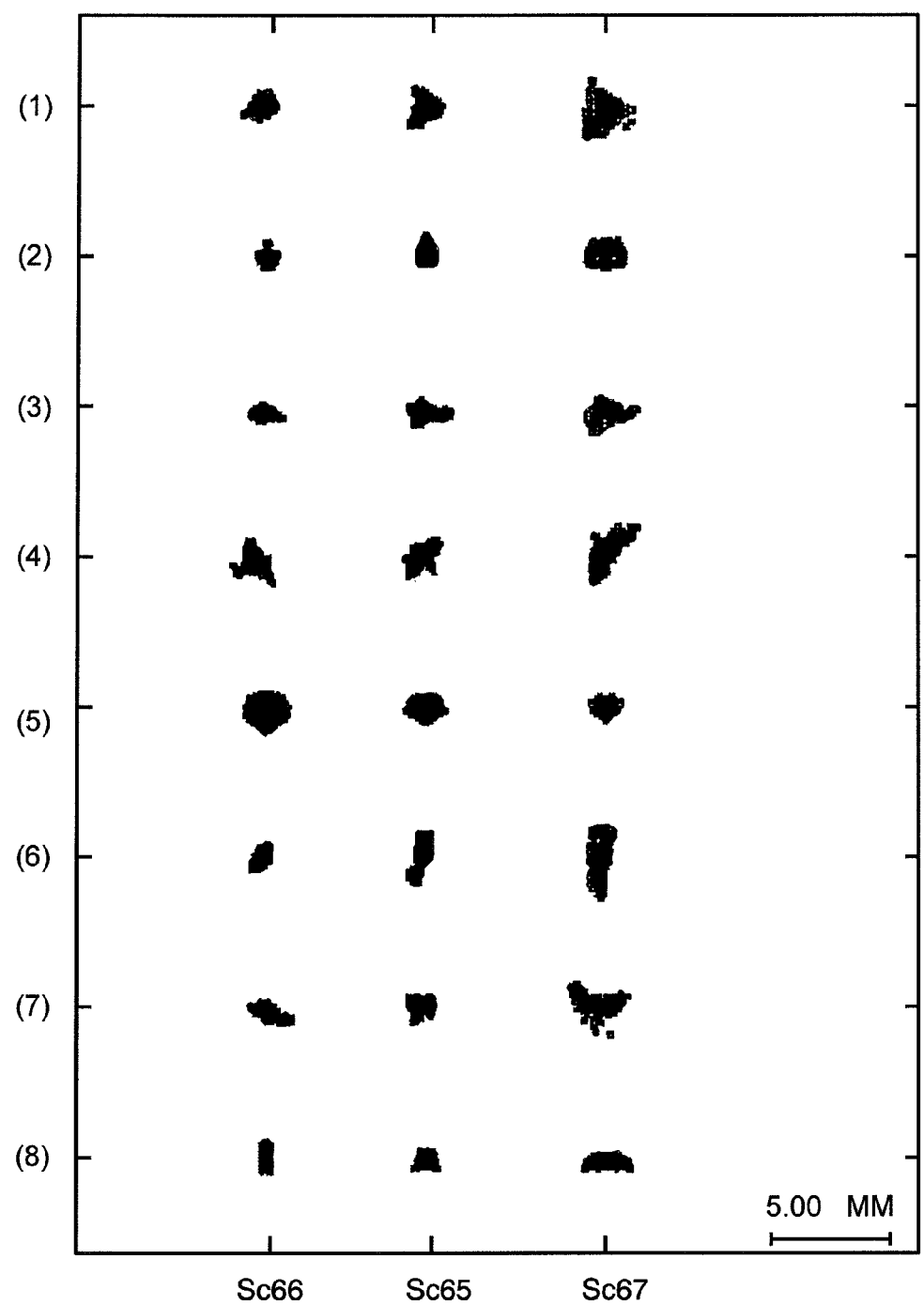
FIG. 26 is a view for showing the spot power in case when shifting a rear lens group within the projection optic unit mentioned above.

On the other hand, FIG. 26 shows the spot diagrams, which are obtained when disposing the screen at the positions 66, 65 and 67 (see FIG. 19 mentioned above), respectively. Further, in this figure are shown the spot diagram of the light flux emitting from eight (8) points on the display screen of the image display element 5; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)), and also, in the horizontal direction thereof are shown the screen positions (i.e., Sc66, Sc65 and Sc67) at the respective positions 66, 65 and 67. Moreover, the unit thereof is "mm", and the horizontal direction on each of the spot diagrams corresponds to the X-direction on the screen, and the vertical direction thereof to the Y-direction on the screen. Thus, as is apparent from those figures, it can be seen that both can maintain the preferable performances, in any case thereof.

And, in case of assuming that the size is "Lo" of the projection image obtained through the mentioned above, in the diagonal direction thereof, and the distance is "Lp" from the center of the free curved surface mirror 4 up to the projection image, since Lo=1,524 mm, Lp=700×cos 45°□495 mm, then the ratio between them comes to be greater than two (L0/Lp>2), therefore it can be seen that an object surface can be projected, enlargedly, onto the screen, being sufficiently large, even with a relatively near distance, i.e., being superior in the ratio of enlarged projection.

Figure 5:
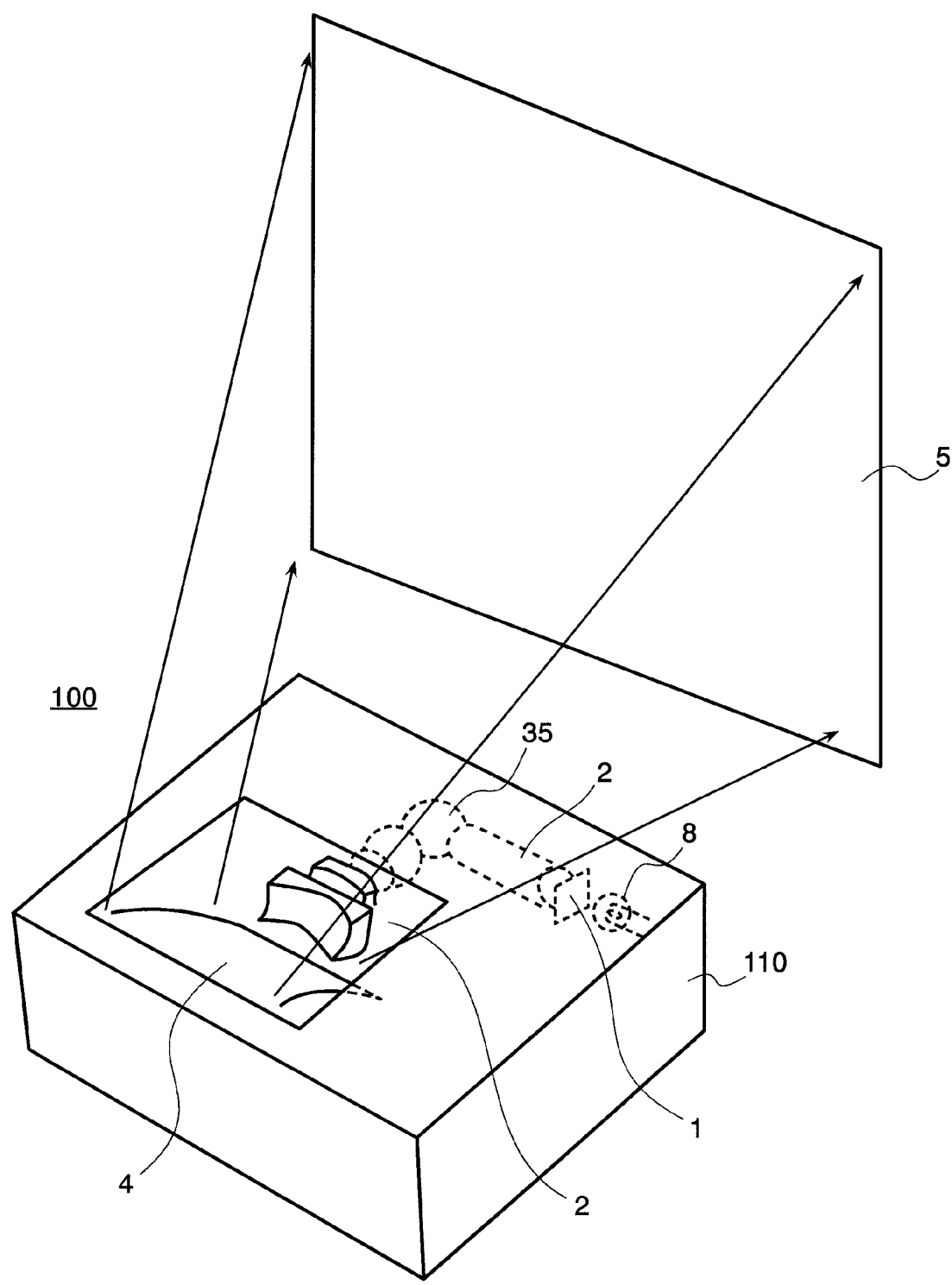
FIG. 5 is a perspective view for showing the entire of a projection-type image display apparatus, according to other embodiment of the present invention.
Figure 6:
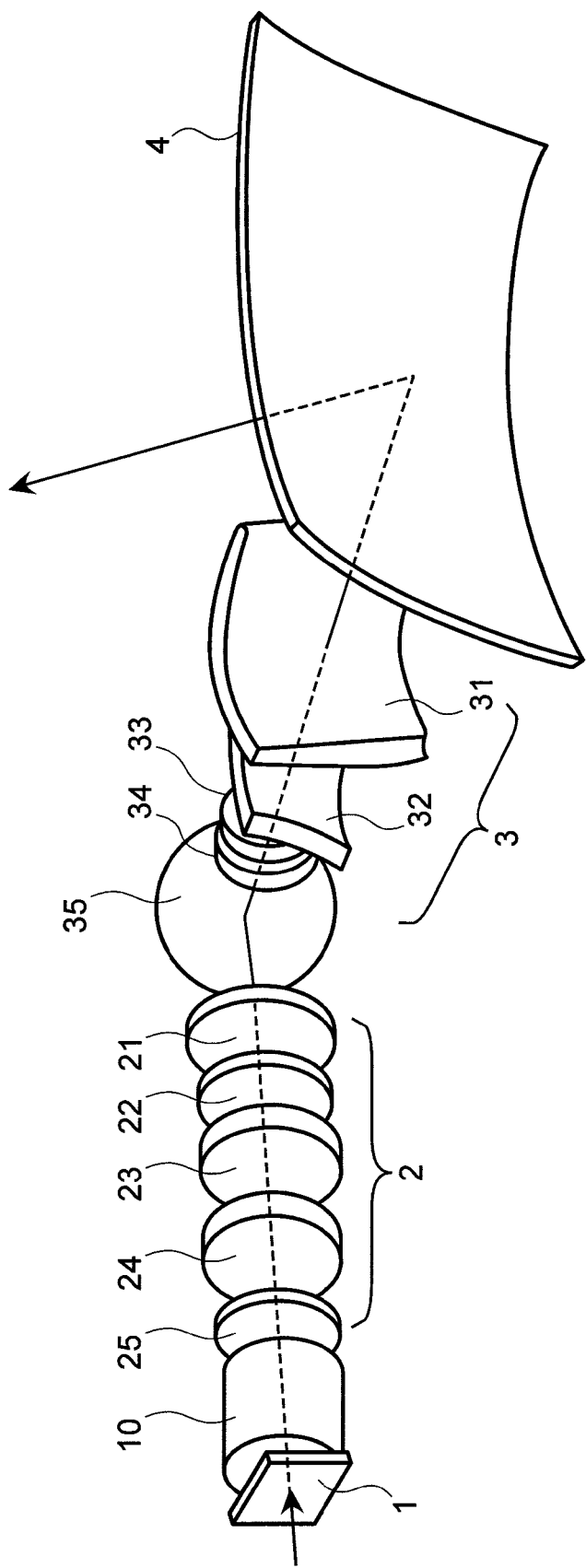
FIG. 6 is a perspective view for showing an example of an arrangement of lenses of the optic unit, within the projection-type image display apparatus, according to other embodiment of the present invention mentioned above.
Figure 27:
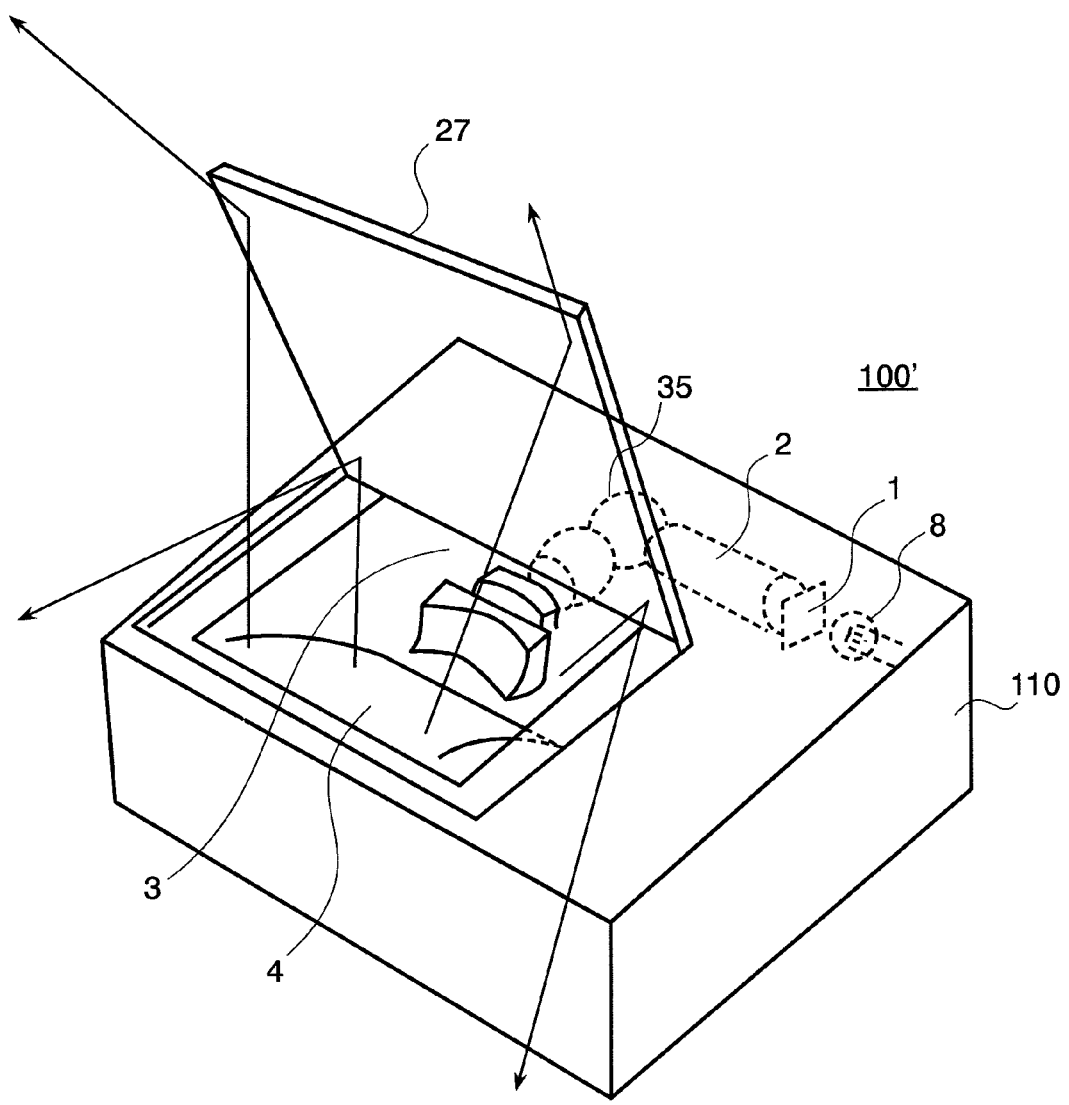
FIG. 27 is a perspective view for showing an example of an arrangement of lenses of the optic unit, within the projection-type image display apparatus, according to further other embodiment of the present invention mentioned above.

Next, FIG. 27 attached herewith shows the projection-type image display apparatus, according to other embodiment of the present invention. Thus, as is apparent from the figure, within the projection-type image display apparatus 100' according to this other embodiment, in addition to the element of projection optic unit, which is shown in FIG. 1 or 5 mentioned above, there is further provided a plane reflection mirror 21 on the optical path between that free curved surface reflection mirror 4 and the screen 5, thereby building up the projection optic unit. However, in the example shown in the figure, this plane reflection mirror 21 is provided in an upper portion thereof, to be freely opened/closed, as well as, functioning as a cover, in common, for covering over an opening portion, which is formed on the upper surface of the housing 110 of the apparatus corresponding to the reflection mirror of the free curved surface mentioned above.

With such the constructions of the projection optic unit mentioned above, as is shown in FIG. 28 attached herewith, the lights emitting from the image display element 1 through the prism 10 enters into the front lens group 2 building up the lens optic system. Thereafter, the lights emitting from this front lens group 2 also pass through the rear lens group 3, being build up with a plural number of lenses, including a plural number (two (2) pieces in the present example), each having the configuration of free curved surface, not being rotationally symmetric (rotationally asymmetric) on at least one of the surfaces thereof. And, after being reflected, enlargedly, upon the reflection optic system, including the reflection mirror (hereinafter, being called the "free curved surface mirror") 4 having the free curved surface configuration, not being rotationally symmetric, the lights emitting from this rear lens group 3 is further reflected upon the plane reflection mirror 21 mentioned above, thereby to be projected upon the screen 5 predetermined (for example, the wall surface of a room or the sheet-like screen, etc.). Thus, as is apparent from this figure, it is projected into the opposite direction to that of the embodiments mentioned above (for example, shown in FIG. 2 or 4). Also from this, with the constructions of the projection optic unit of the projection-type image display apparatus 100' according to this other embodiment, since the optical path from the free curved surface mirror 4 to the screen is bent by means of the plane reflection mirror 21 mentioned above, it is possible to make the distance up to the screen 5 small, and thereby it is preferable for obtaining the wide view angle.

Figure 28:
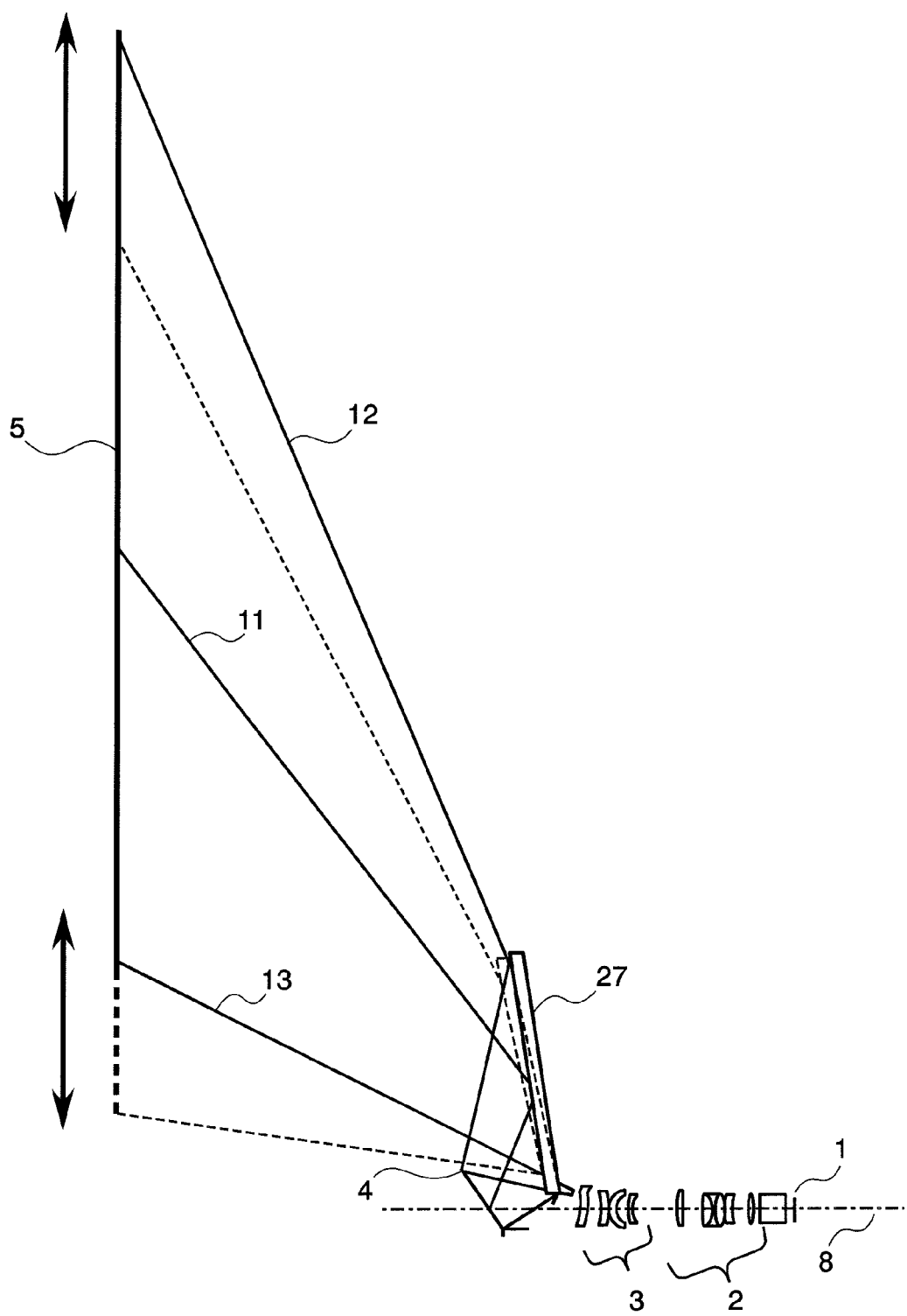
FIG. 28 is a cress-section view of the projection optic unit of the projection-type image display apparatus, according to the further other embodiment mentioned above.

Also, with the structures of this projection optic unit, as shown by broken lines in FIG. 28, the plane reflection mirror 27 is made to be adjustable by a very fine angle in the inclination angle thereof. Thus, with this, also as shown by the broken lines and arrows in the figure, it is possible to change the position of the projection image, vertically (up and down) upon the screen 5, by changing the inclination angle of this plane reflection mirror 27, and this enable to provide a preferable function, in particular, for the projection-type image display apparatus. Further, this plane reflection mirror 27 is adjustable in the inclination angle thereof, for a user, depending upon the using condition of said projection-type image display apparatus, or alternately though not shown in the figure herein, but it is also possible to construct, so that it moves (or rises up) from the position for covering over the opening portion on the upper surface of the housing 110 and thereby to be disposed inclining at an angle preset by the user, by means of a driving mechanism, for example, including an electric motor, etc.

However, with the projection-type image display apparatus mentioned above, according to the embodiment of the present invention, the image (or the picture) from the image display element 1, emitting from the projection optic unit mentioned above, is reflected upon the free curved surface mirror 4, or alternately, it is further reflected upon the plane reflection mirror 27, to be projected upon the screen 5. For this reason, it is necessary to determine or locate the position of the said apparatus 100 or 100', correctly, with respect to the screen 5, upon which the image (or the picture) should be projected. Thus, it is important to make an adjustments on the arrangements, so that a beam of light at the center of the image shown in FIG. 5 mentioned above comes up to be vertical or perpendicular with respect to the surface of the screen 5, in particular, for obtaining a preferable projection image, with suppressing the distortion and/or aberration as a whole thereof.

Then, the projection-type image display apparatus according to the embodiment of the present invention includes a positioning mechanism for that apparatus in a part thereof, and an explanation will be given below, about an example of the details thereof.

FIGS. 29(*a*) to 29(*c*) show the projection-type image display apparatus 100, including the positioning mechanism mentioned above, and in particular, FIG. 29(*a*) shows a perspective view of the projection-type image display apparatus 100 including the positioning mechanism, seeing from an upper surface thereof, FIG. 29(*b*) the perspective view of the said apparatus from the bottom surface thereof, and FIG. 29(*c*) an enlarged c-c cross-section in FIG. 29(*b*), respectively.

Figure 29A:
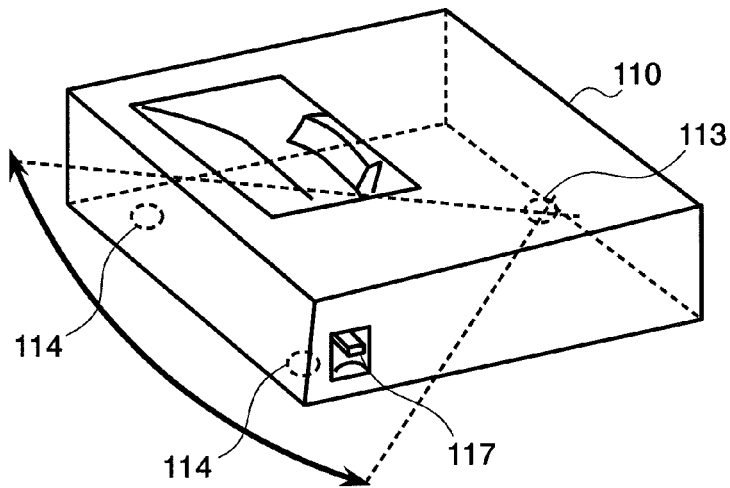
FIGS. 29(a) to 29(c) are views for explaining the structures of a positioning mechanism, which is attached in a part of the projection-type image display apparatus, according to present invention, as well as the way of using thereof.
Figure 29B:
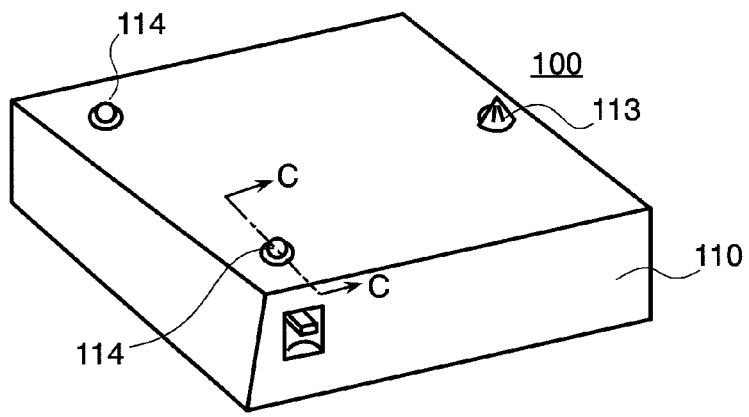
Figure 29C:
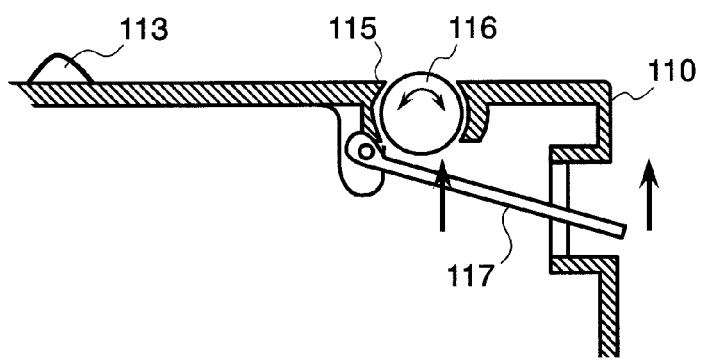

Thus, as is shown in FIG. 29(*b*), on the bottom surface of the housing 110 of the projection-type image display apparatus 100 are provided the followings; i.e., a center stopper 113, being made of an elastic material, such as, rubber, etc., into a conic shape, for example, is attached at the central portion thereof, neighboring to an edge portion in direction of light projection (i.e., the right-hand direction in the figure), while in the vicinity of both ends thereof, neighboring to an edge portion at the opposite side of the edge portion mentioned above, there are provided a pair of moving members 114 and 114, each being made from a rotating ball, for example.

However, in each of the pair of moving members 114 and 114, as is also shown in FIG. 29(*c*), a ball 116 is held within a receiving hole 115, which is formed on a bottom surface of the housing 110, and further, within an inside of that housing 110 is provided a restriction member (or a suppression member) 117, for stopping the rotation of the ball 116 mentioned above, accompanying the movement thereof into the direction of an arrow. Thus, pressing down of the restriction member (or the suppression member) 117 in the figure by a user (but, FIG. 29(*c*) shows it upside down) pushes the ball 116 onto an interior wall surface of the receiving hole 115, and thereby stopping the rotation thereof.

An example of the method of using the positioning mechanism mentioned above will be shown in FIG. 29(*a*). First of all, under the condition of shifting the restriction member (or the suppression member) 117 upwards (i.e., brining the ball 116 into rotatable condition), the projection-type image display apparatus 100 is disposed in parallel on a disk or the like, for example, while directing the bottom surface of the housing 110 thereof downwards. And, as is shown by an arrow in the figure, the said apparatus 100 (100') is moved, rotating around the stopper 113 mentioned above, by pushing on a side surface thereof, etc., while projecting the image (or the picture) on the screen 5. And, at the time point when the projection-type image display apparatus 100 comes up to a desired angular position with respect to the screen 5, the pair of moving members 114 and 114 are pushed down, which are provided on both side-surfaces of the housing 110 of that apparatus. Thus, with the projection-type image display apparatus 100 equipped with the positioning mechanism mentioned above, it is possible to determine the position, correctly, with respect to the screen 5, with a simple manner, with the operations mentioned above, and further, with providing the moving mechanism, appropriately, for the plane reflection mirror 21 and/or the rear lens group 3 mentioned above, it is also possible to obtain a preferable projection image, with suppressing the distortion and the aberration down to the minimum as a whole thereof.

As was mentioned in the above, according to the present invention, because of no necessity of offsetting the lens(es) to be applied therein, as is shown in the conventional art mentioned above, it is possible to provide the projection-type image display apparatus for enabling the wide angle of view, but without necessity of providing the additional optic system having large aperture, also suppressing the distortion down to the minimum even when changing the position or distance up to the screen, and further being relatively easy in manufacturing thereof. And, with such the projection-type image display apparatus, it is possible to achieve a projection-type image display apparatus for enabling to obtain a preferable projection image, with suppressing the distortion and the aberration down to the minimum as a whole thereof, as well as, being superior in the operability thereof.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection type image display apparatus, comprising:
   an image display element;
   a first lens group, being disposed in a light direction with respect to said image display element, which is configured to include a plural number of lenses;
   a second lens group, being disposed in a light direction with respect to said first lens group, which is configured to include a plural number of lenses; and
   a reflection mirror, which is configured to reflect lights emitted from said second lens group, so as to project upon a screen obliquely;
   wherein between a plural number of lenses making up said second lens group, at least one outer shape configuration thereof is an asymmetric circle configuration with respect to an optical axis of a lens;
   wherein said first lens group, is disposed beside said image display element, and said second lens group is disposed between said first lens group and said reflection mirror;
   wherein an optical path length starting from a final surface of said first lens group and reaching to a reflection surface of said reflection mirror, on a path, along which a central light beam of a projection optical unit including said first lens group and said second lens group propagate directing to said screen, is at least five times a length of a focus distance of said first lens group; and
   wherein said second lens group includes a refractive lens having a negative power, which has a rotationally symmetric surface configuration, and further comprising a rod, which is configured to move in the optical direction, with respect to said first lens group.

2. The projection type image display apparatus, according to claim 1, wherein an optical axis of at least said first lens group is included to a normal line at a center of a surface of said display element.

3. The projection type image display apparatus, according to claim 1, wherein the following equation is satisfied:

$$|L1-L2|<1.2*\sin\Theta s*Dv;$$

wherein L1 is distance of a path of a light beam entering from an upper end portion of a reflection surface of said mirror into an upper end portion of said screen, L2 is distance of a path of a light beam entering from a lower end portion of the reflection surface of said reflection mirror into a lower end portion of said screen Dv is distance from the upper end portion of said screen to the lower end thereof, and $\Theta$s is an angle defined by a central portion of said reflection mirror and the normal line on the screen.

4. The projection type image display apparatus, according to claim 1, wherein said rod is operable from an outside of said projection type image display apparatus.

* * * * *